United States Patent [19]
Buckmiller et al.

[11] Patent Number: 5,609,349
[45] Date of Patent: Mar. 11, 1997

[54] VEHICLE FORK

[75] Inventors: Daniel K. Buckmiller; David W. Erickson; Douglas G. Olsen; Randall J. Philpot, all of Salt Lake City, Utah

[73] Assignee: Advanced Composites, Inc., Salt Lake City, Utah

[21] Appl. No.: 294,421

[22] Filed: Aug. 22, 1994

[51] Int. Cl.$^6$ ................................................. B62K 21/04
[52] U.S. Cl. ........................ 280/280; 280/281.1; 280/279
[58] Field of Search ................................ 280/279, 280, 280/281.1, 288.3, 275, 276

[56] References Cited

U.S. PATENT DOCUMENTS

| | | | |
|---|---|---|---|
| 624,182 | 5/1899 | Cook | 280/280 |
| 1,511,350 | 7/1922 | Meiselbach | 280/280 |
| 3,147,975 | 5/1960 | Gruss et al. | 273/82 |
| 3,258,511 | 6/1966 | McGregor | 264/45 |
| 3,478,134 | 11/1969 | Gruss et al. | 264/45 |
| 3,533,643 | 10/1970 | Yamada | 280/281 |
| 3,619,436 | 11/1971 | Gruss et al. | 264/45 |
| 4,067,589 | 1/1978 | Hon | 280/278 |
| 4,298,556 | 11/1981 | Rutsch et al. | 264/46.6 |
| 4,351,786 | 9/1982 | Mueller | 264/46.7 |
| 4,548,422 | 10/1985 | Michel et al. | 280/281 R |
| 4,550,927 | 11/1985 | Resele | 280/281 R |
| 4,565,383 | 1/1986 | Isaac | 280/276 |
| 4,614,627 | 9/1986 | Curtis et al. | 264/46.6 |
| 4,714,575 | 12/1987 | Preston | 264/46.4 |
| 4,923,203 | 5/1990 | Trimble et al. | 280/288.3 |
| 5,011,172 | 4/1991 | Bellanca et al. | 280/281.1 |
| 5,016,895 | 5/1991 | Hollingsworth et al. | 280/280 |
| 5,042,968 | 8/1991 | Fecto | 416/226 |
| 5,060,961 | 10/1991 | Bontrager | 280/276 X |
| 5,078,417 | 1/1992 | Mouritsen | 280/280 |
| 5,181,732 | 1/1993 | Bezin et al. | 280/281.1 X |
| 5,213,322 | 5/1993 | Matsuo et al. | 271/275 |
| 5,215,322 | 6/1993 | Enders | 280/231 |
| 5,318,742 | 6/1994 | You | 280/281.1 X |
| 5,368,804 | 11/1994 | Hwang et al. | 280/281.1 X |

FOREIGN PATENT DOCUMENTS

| | | | |
|---|---|---|---|
| 0895046 | 5/1943 | France. | |
| 3804342 | 8/1989 | Germany | 280/281.1 |
| 0448310 | 5/1949 | Italy. | |
| 0019193 | 10/1895 | United Kingdom. | |

*Primary Examiner*—Brian L. Johnson
*Assistant Examiner*—Victor E. Johnson
*Attorney, Agent, or Firm*—Daniel P. McCarthy; Mark G. Sandbaken

[57] ABSTRACT

A fork for use on a vehicle, such as a bicycle. The fork includes a steer tube, a crown and two fork legs. The steer tube includes a cylindrical main body portion, an upper insert portion intended for attachment to a handlebar-holding mechanism, and an inner reinforcing sleeve that adds strength to the steer tube. The main body of the steer tube and the fork legs are manufactured from resin and filament in order to yield a very high strength, lightweight and shock-absorbing fork.

4 Claims, 18 Drawing Sheets

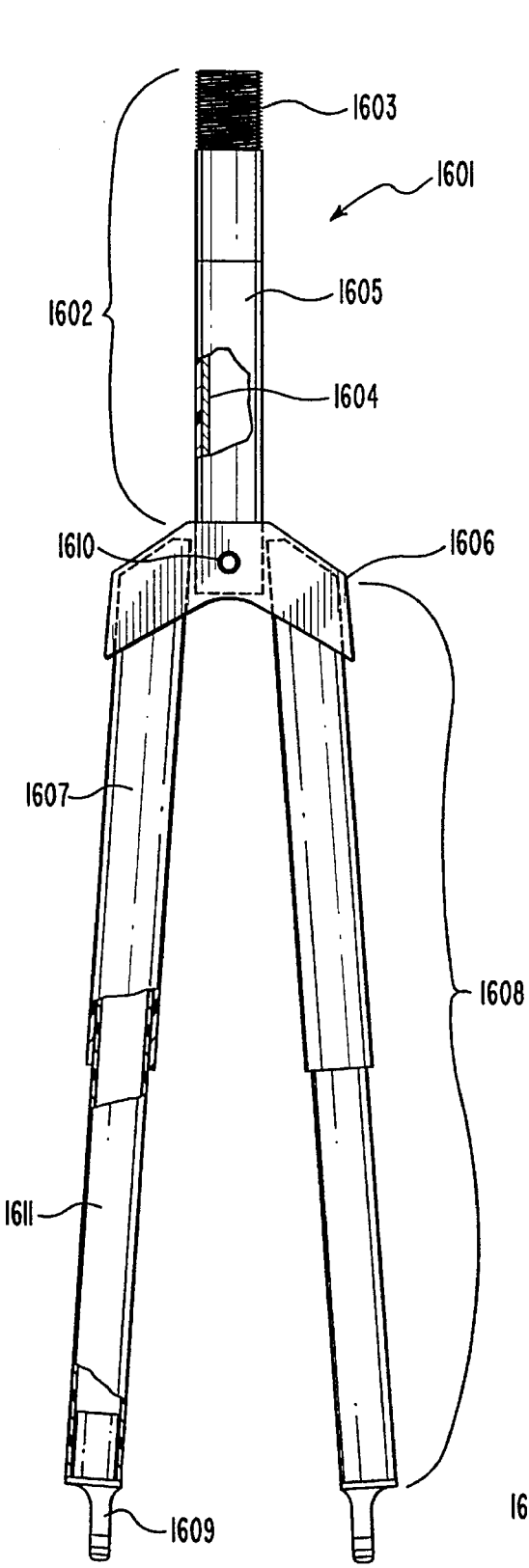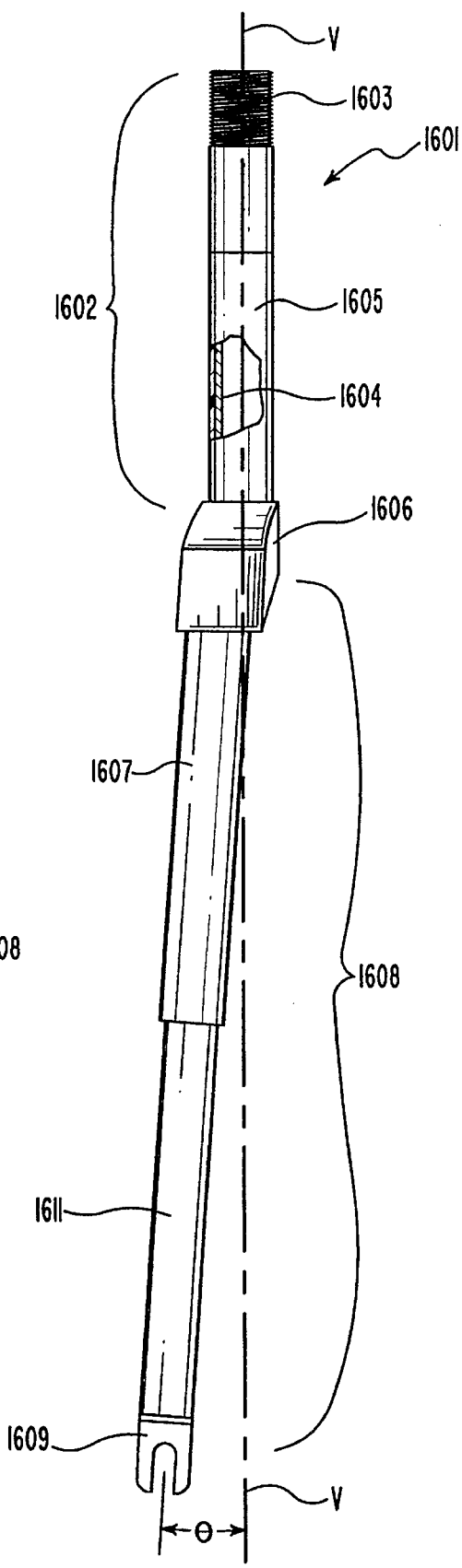
FIGURE 16
FIGURE 17

VEHICLE FORK

I. BACKGROUND OF INVENTION

A. Field of Invention

The invention is directed to the field of manufacturing processes relevant to the production of high strength articles such as any article having a structural component including vehicle frames generally and bicycle frames specifically, and to articles produced by such processes, and composite bicycle forks and other components. In the preferred embodiment the invention is directed to a method for manufacturing a composite bicycle frame such as a filament wound bicycle frame, the related bicycle frame, and related bicycle components including a composite bicycle fork.

B. The Background Art

In the prior art, various bicycle frames and frame components were known, including those described in U.S. Pat. No. 4,923,203 in the name of Trimble et al., U.S. Pat. No. 5,213,322 in the name of Enders, U.S. Pat. No. 4,067,589 in the name of Hon, U.S. Pat. No. 5,011,172 in the name of Bellanca et al., U.S. Pat. No. 4,550,927 in the name of Resele, U.S. Pat. No. 4,548,422 in the name of Michel et al., U.S. Pat. No. 3,533,643 in the name of Yamada, U.S. Pat. No. 5,016,895 in the name of Hollingsworth, U.S. Pat. No. 4,923,203 in the name of Hollingsworth, and U.S. Pat. No. 4,565,383 in the name of Isaac, each of which is hereby incorporated by reference in its entirety for the material disclosed therein. Foreign patents containing pertinent disclosure include Italian Patent No. 448,310 in the name of F. Janecek, French Patent No. 895,046 in the name of Delorge et al., and U.K. Patent No. 19,193 in the name of Otto Schonauer, each of which is hereby incorporated by reference in its entirety for the material disclosed therein.

In the prior art it was known that traditional bicycle frames could be constructed from metal tubing that was round in cross section. Referring to FIG. 1, it can be seen that such traditional round tubing frames typically consisted of two main triangle shapes 101 and 102. The larger of these two triangle shapes 101, referred to herein as the front triangle 101, consisted of a seat tube 103, a top tube 104 and a down tube 105 which were welded or adhesively joined to appropriate lugs (such as head lug 106 and bottom bracket lug 107). In the prior art, it should be noted that the bicycle frame could be constructed by laying up composite pre-preg into a female mold to produce a monocoque frame. Two smaller triangle shapes 102 were employed, referred to herein as the rear triangles 102. Each consisted of a seat stay 108, a chain stay 109 and a seat tube 103 which was shared with the front triangle. The rear triangle assembly 102, when viewed from the side, appeared to be a single triangle, but when viewed from the top or rear, actually was two spaced apart rear triangles each terminating at its rear in an axle drop-out 110 for mounting of a rear bicycle wheel.

In the prior art it was known that filament wound tubing could be constructed and that articles could be made therefrom. In the prior art if it was desired to manufacture a bicycle frame using filament wound tubing typically individual tubing members which were round in cross section would be constructed and then joined to aluminum cast lugs and more recently to composite lugs. Composite tubing used in conventional tube and lug frames to date has largely been produced using carbon/epoxy or graphite/epoxy pre-preg and roll wrapping process. Alternatively, in the prior art a hollow bicycle frame could be made from square tubing using a lay-up, braiding process. The reader's attention is directed to U.S. Pat. No. 5,215,322 and to U.S. Pat. No. 4,923,203 for general prior art disclosure. It was also known in the prior art that bicycle frames or portions thereof could be made by injection molding. For general reference the reader is directed to U.S. Pat. Nos. 5,011,172 and 4,067,589.

The prior art does not reveal, however, how to manufacture a bicycle frame by a filament winding process so that the resulting frame is light weight, strong, attractive, and cost efficient to manufacture. Nor does the prior art disclose a composite bicycle fork with the structure and characteristics of the invented fork. The invented frame meets these needs by providing a frame useful for road bicycles, mountain bicycles, tandem bicycles, and other wheeled vehicles.

II. SUMMARY OF INVENTION

It is an object of the invention to provide a bicycle frame which is strong. In the preferred embodiment, it is a feature of the invented bicycle frame that it utilizes triangular structural elements which are inherently strong due to their geometry, and which are fiber reinforced composites, such as filament wound composites, which are inherently strong due to their structure and materials.

It is an object of the invention to provide a bicycle frame which is light weight. It is a feature of the bicycle frame that it is made from fiber reinforced composites, such as filament wound composites with structural foam filler, which are exceptionally light yet strong. It is also a feature of the invention that the structure of the invented bicycle frame does not require large amounts of construction material, resulting in a frame that minimizes the use of materials, resulting in a low total weight.

It is an object of the invention to provide a bicycle frame which is durable. The combined preferred geometric structure and preferred materials result in a bicycle frame which shows exceptional durability.

It is an object of the invention to provide a bicycle frame which is cost efficient to manufacture. The preferred net shape filament winding process permits very quick, low cost and labor non-intensive manufacture of bicycle frame components and completed bicycle frames.

It is an object of the invention to provide a bicycle frame which absorbs shock which would ordinarily be transferred from the road or other riding surface to the rider through the bicycle frame. It is an inherent quality of the preferred composite materials, such as the filament wound materials having a structural foam core as in the preferred embodiment, that they have the desired stiffness yet absorb shock, providing the rider with a comfortable, low vibration ride. It is a feature of the invented bicycle fork that it exhibits the desired stiffness while it will also absorb shock and vibration rather than transferring them to the rider.

It is an object of the invention to provide a bicycle frame which is aesthetically appealing. In the preferred embodiment, filament wound components having flat surfaces are finished with a high luster, clear coating resulting in an attractive finished product in which the attractive filament wound pattern is visible. Alternatively, opaque coatings or finishes may also be used.

It is an object of the invention to provide a bicycle frame of which the majority of the external surface area is flat to facilitate finishing operations such as sanding, filling and painting. It is a feature of the filament wound components used in the preferred embodiment that they are wound and cut so that they have many flat surfaces which make both finishing and bonding easier. As an alternative in some embodiments of the invention, post processing of the frame and/or frame components may be used to achieve a finished product with curved surfaces, such as by molding or securing a quantity of material to the frame or component in a curved configuration.

It is an object of the invention to provide a bicycle frame which is quick and inexpensive to manufacture. It is a feature of the net shape filament winding process that many components may be cut from a single piece of wound component stock, and the components may then be assembled with little effort beyond the application of an adhesive. The result is a frame that is both quick and inexpensive to manufacture.

It is an object of the invention to provide a manufacturing process that enables the production of multiple structural elements or other components from a single filament winding operation. It is a feature of the operation that on a single mandrel in a single filament winding operation, a length of structural element stock or cap stock is manufactured from which numerous structural elements or caps may be cut, in a fashion similar to slicing bread from a loaf. It is also a feature of the invention that tubing, such as the preferred fork tubing, may be manufactured in lengths of many feet and then numerous individual fork legs cut from the tube lengths. It is an advantage of the invention that such efficient use of the filament winding process yields structural components with a high strength to weight ratio and having all of the other desirable characteristics that filament wound parts are known for, while being very inexpensive and quick to manufacture in large quantities.

It is an object of the invention to provide a strong bicycle frame that resists breakage and has the desired stiffness. It is a feature of the invention that the preferred composite material of the invention, such as the structural foam-filled filament wound composite, may be selected to yield components that are exceptionally strong, have the desired stiffness and have superior fatigue properties.

It is an object of the invention to provide a bicycle fork with a high strength to weight ratio. In the preferred embodiment the invented composite bicycle fork is manufactured using a filament winding process and is assembled in a physical structure which yields an exceptionally strong bicycle fork that is surprisingly light in weight.

It is an object of the invention to provide a bicycle fork which absorbs shock and vibration from the road to insulate the rider from these disturbances. It is a feature of the invention that the preferred composite materials inherently absorb shock and vibration without ill effect, thereby providing the desired insulating function and resulting in a bicycle fork which yields a comfortable ride over varied terrain. It is also a feature of the invention that the preferred fork legs are more rigid at the crown than they are at the front wheel dropouts, resulting in a fork which effectively absorbs road vibration and shock through flex yet maintains high performance.

It is an object of the invention to provide a bicycle fork which is durable and not subject to fatigue. It is a feature of the invention that the composite fork in the invented structure will flex without fatigue or cracking.

It is an object of the invention to provide a fork which is capable of an increasing amount of flex as one moves along the fork from the crown to the axle drop outs. In the preferred embodiment, the invented composite fork is tapered, and consists of two or more pieces resulting in the desired flex.

It is an object of the invention to provide a light weight steer tube. It is a feature of the invention that the preferred steer tube includes a substantial section of filament wound tube that is lighter weight compared with an aluminum or steel tube of the same strength and durability.

Additional objects, features and advantages of the invention will become apparent to persons of ordinary skill in the art upon reading the remainder of the specification and upon referring to the attached Figures.

III. BRIEF DESCRIPTION OF THE DRAWINGS

FIG. 16 is a front view of the assembled preferred bicycle fork.

FIG. 17 is a side view of the assembled preferred bicycle fork.

IV. DESCRIPTION OF THE PREFERRED EMBODIMENT

A. Structure of the Invented Articles

1.) Bicycle Frame and Components Thereof

Figure 1:
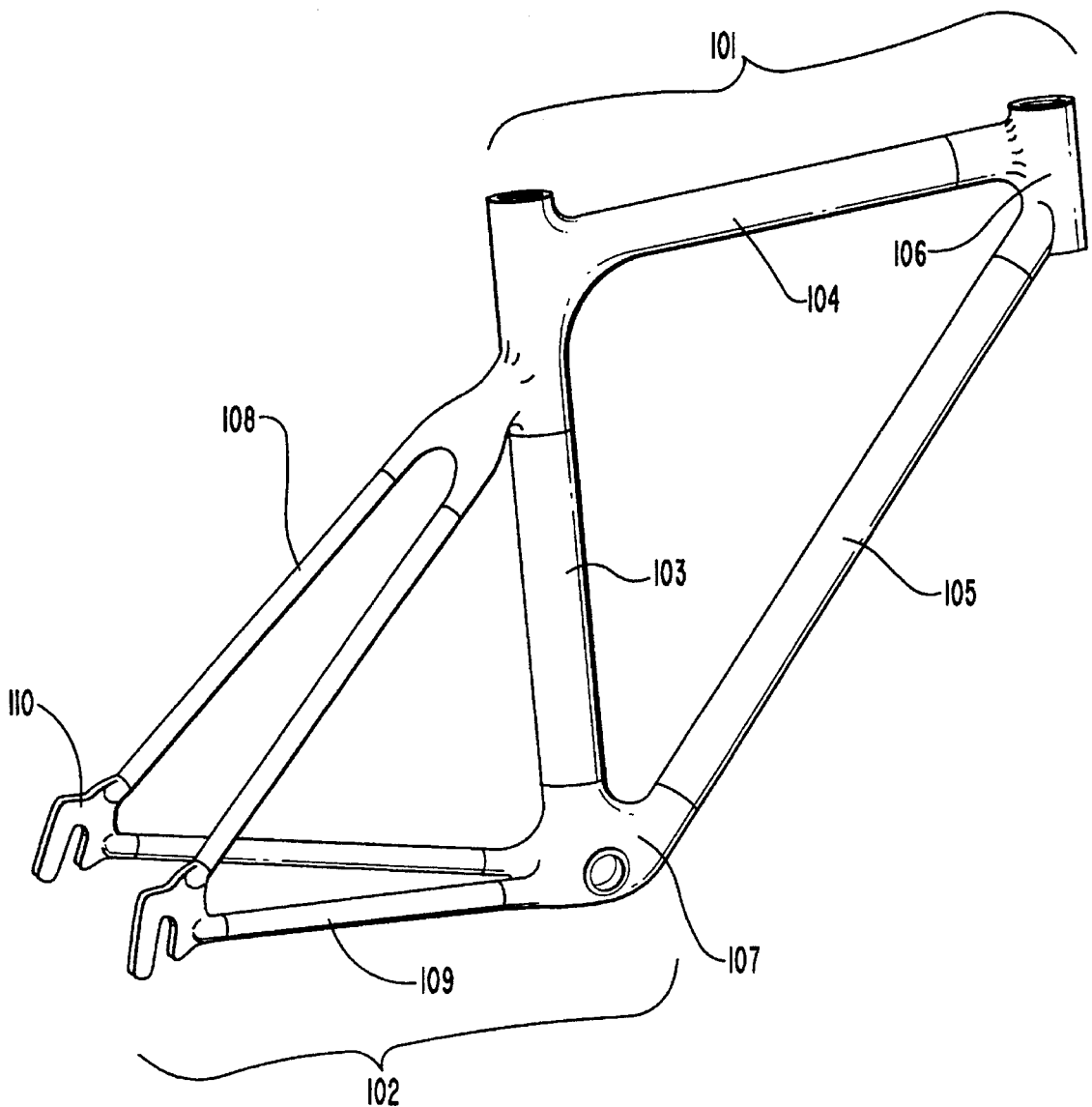
FIG. 1 depicts a perspective view of a prior art bicycle frame which uses tubing that is round in cross section.
Figure 2:
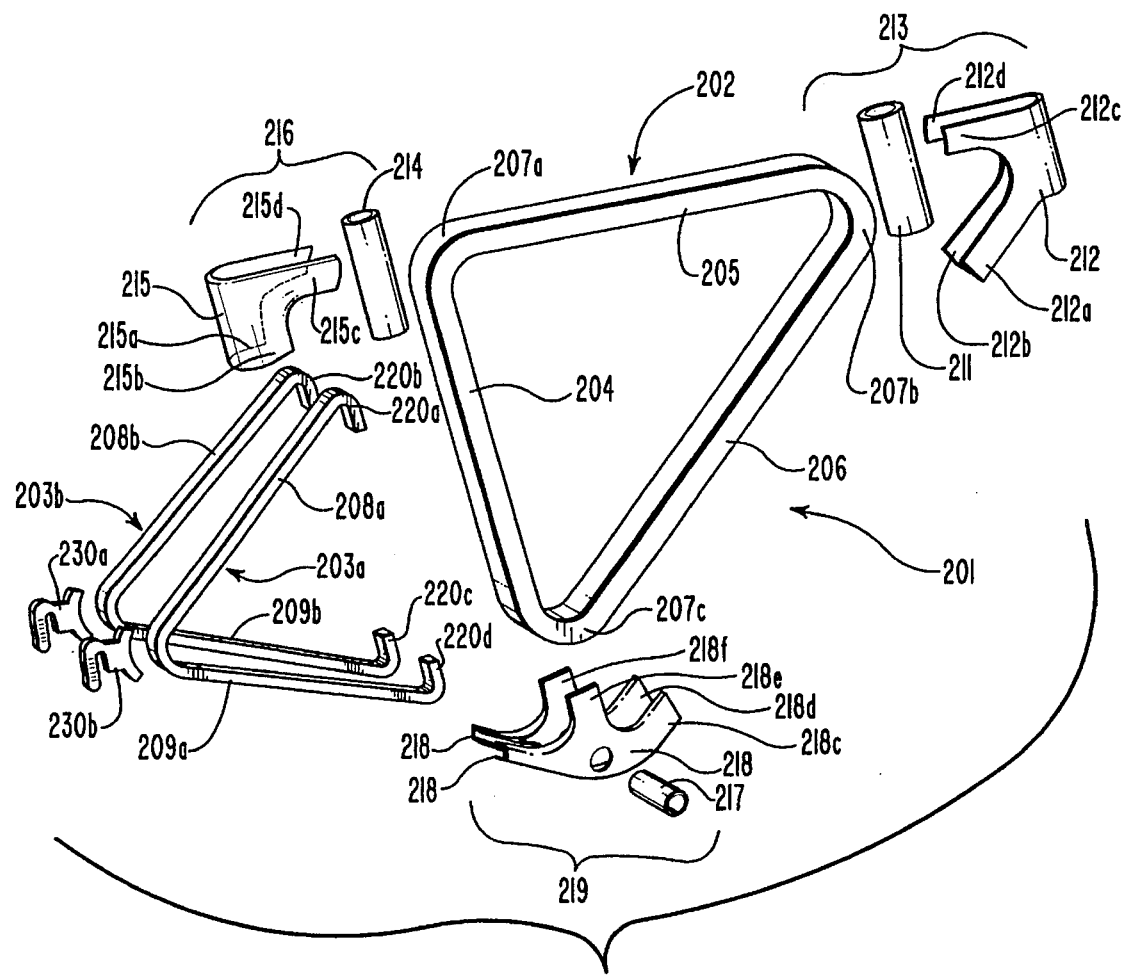
FIG. 2 depicts an exploded view of one preferred embodiment of the bicycle frame of the present invention, such as may be used on a road bicycle or other bicycles.

Referring to FIG. 2, an exploded view of components used to assemble a preferred bicycle frame 201 of the invention are shown. The components include a front three-sided structural element 202 and two rear structural elements 203a and 203b which were manufactured as three-sided structural elements but from which a section of material which was not needed has been cut. The various structural elements 202, 203a and 203b are the members which provide the bicycle frame 201 with its primary structural strength.

The front structural element 202 includes a seat beam 204, a top beam 205 and a down beam 206 arranged generally in the shape of a triangle. From the Figure it can be seen that in the preferred embodiment, the triangle shape of the structural element does not have sharp angular corners 207a, 207b and 207c. Rather, the corners 207a, 207b and 207c of the front structural element 202 are rounded for manufacturing convenience and for structural, performance and aesthetic reasons. In alternate embodiments, the corners of the structural element may be rounded or not, as desired, and the structural element need not be three sided. The front and rear structural elements do not necessarily need to be three-sided, and in alternative embodiments they could be round, elliptical, pentagonal, rectangular, octagonal, oval, multi-sided or otherwise, as desired. Triangular structural elements were chosen in the preferred embodiment for their inherent strength.

Each rear structural element 203a and 203b includes a seat stay 208a and 208b, a chain stay 209a and 209b, and two protrusions 220a, 220b, 220c and 220d which are used to bond or join the rear structural elements 203a and 203b to the front structural element 202. Although the rear structural elements 203a and 203b could include a seat beam which would be joined to the seat beam 204 of the front structural element 202, such a rear structural element seat beam is considered redundant and has been eliminated in the preferred embodiment to save weight. In alternative embodiments of the invention, a rear structural element seat beam may be included.

For assembly in the preferred embodiment, the rear seat beam mounting protrusions 220a, 220b, 220c and 220d are cut or routed at an angle so that when they are mounted on the seat beam 204, each rear structural element 203a and 203b angles slightly away from the other so that a space is provided between them for mounting of a rear bicycle wheel.

Also depicted in the Figure are a head tube 211 and head tube cap 212 which together comprise a head set or lug 213. Similarly, a seat tube 214 and seat tube cap 215 comprise a seat lug 216. And a bottom bracket housing 217 and bottom bracket cap 218 comprise a bottom bracket lug. Axle dropouts 230a and 230b are installed on each rear triangle 203a and 203b at the intersection of the chain stay and seat stay to facilitate installation of a rear wheel to the frame 201. It should also be noted that although they are not shown in the Figure, in some embodiments certain reinforcing pieces may be utilized to enhance the structural integrity of the frame.

Figure 3:
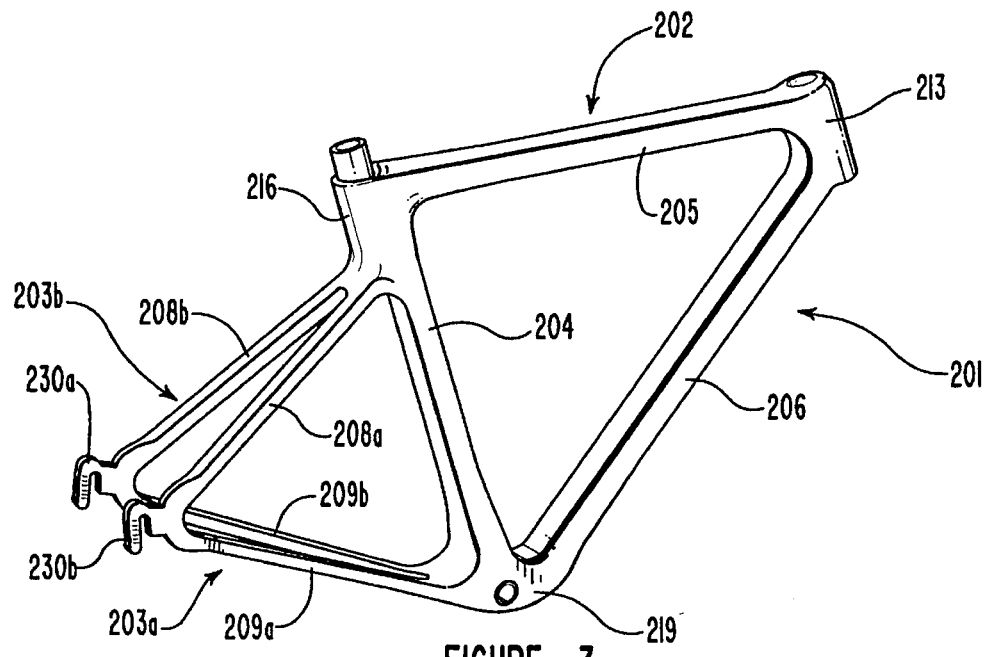
FIG. 3 depicts an assembled bicycle frame of the present invention.

In FIG. 3, the components of FIG. 2 can be seen assembled into a bicycle frame 201. From the Figures it can be seen that the head tube 213 is installed at the foremost corner 207b (the corner where the top beam 205 and the down beam 206 meet) of the front structural element 202, and that the head tube cap 212 is installed over the head tube 211 and onto the front structural element 202 at its foremost corner. The head tube cap 212 has mounting protrusions 212a, 212b, 212c and 212d for mounting against the sides of the front structural element 202 and the combination of mounted head tube 211 and head tube cap 212 forms a head lug 213.

Mounted against the front structural element seat beam 204 is the seat tube 214. The seat tube 214 is mounted to the front structural element seat beam 204 just above the rear structural element mounting protrusions 220a and 220b. A seat tube cap 215 is installed over the seat tube 214 and onto the front triangle top tube 205 and seat tube 204 so that the mounting protrusions 215a, 215b, 215c and 215d mount to the sides of the front structural element 202, resulting in a seat lug 216 on the bicycle frame 201.

At the bottom of the bicycle frame 201, a bottom bracket lug 219 is formed by the mounting of a bottom bracket tube 217 and a bottom bracket cap 218 to the front structural element at the juncture of the front structural element seat beam 204 and the down tube 206, and to the rear structural elements 203a and 203b at the juncture of the rear structural element mounting protrusions 220c and 220d and the rear structural element chain stays 209a and 209b. The bottom bracket tube cap 218 has a plurality of mounting protrusions 218a, 218b, 218c, 218d, 218e and 218f for mounting against the sides of the various structural elements.

Figure 4:
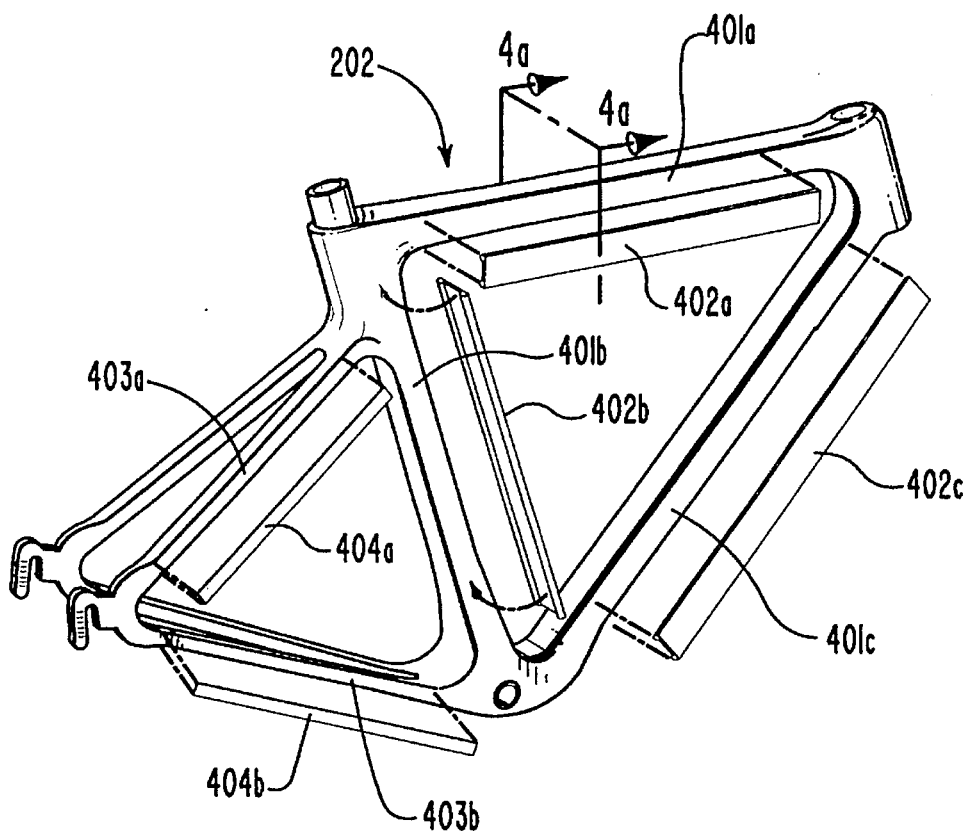
FIG. 4 depicts the bicycle frame of FIG. 3 with reinforcing side members shown in explosion.

Referring to FIG. 4, an alternative embodiment of the invention is shown. The bicycle frame 201 with front structural element 202 is shown. At dashed lines 401a, 401b and 401c, one or more channels or receptacles may be made, such as by using a router, to create a receptacle to accommodate a side reinforcing member 402a, 402b and 402c. The side reinforcing members 402a, 402b and 402c may be installed in the channels to provide the bicycle frame with enhanced structural integrity and durability. Channels or tracks may also be made on the bicycle frame 201 to accommodate installation of cables such as gear shift and brake cables therein or to accommodate the installation of anything else desired to be installed in a channel or track. A cover such as a side reinforcing member may be installed over the channels or tracks for cosmetic appeal and for the structural reinforcement provided by the cover. In the preferred embodiment, channels are routed from a foam layer which is between two filament wound composite layers of the front structural element 202. Reinforcing side members are provided, resulting in a foam-filled rectangular tube bicycle frame beam (see FIG. 4a for a cross section). Referring to FIG. 4, it can be seen that side reinforcing members 404a and 404b are provided for the rear structural elements 403a and 403b as well. In the preferred embodiment, each structural element has a side reinforcing member on each of its left and right sides. It is preferred that the reinforcing side members be epoxied into their respective channels, although other installation and fastening techniques could be used. Although in FIG. 4 multiple straight, elongate reinforcing side members are depicted, it is possible to use reinforcing side members which match the shape of the reinforcing element. For example, three-sided reinforcing side members with rounded corners could be used to reinforce the front structural element of the preferred embodiment. Or reinforcing side members with various cross sectional shapes and other physical configurations could be used.

Figure 4A:
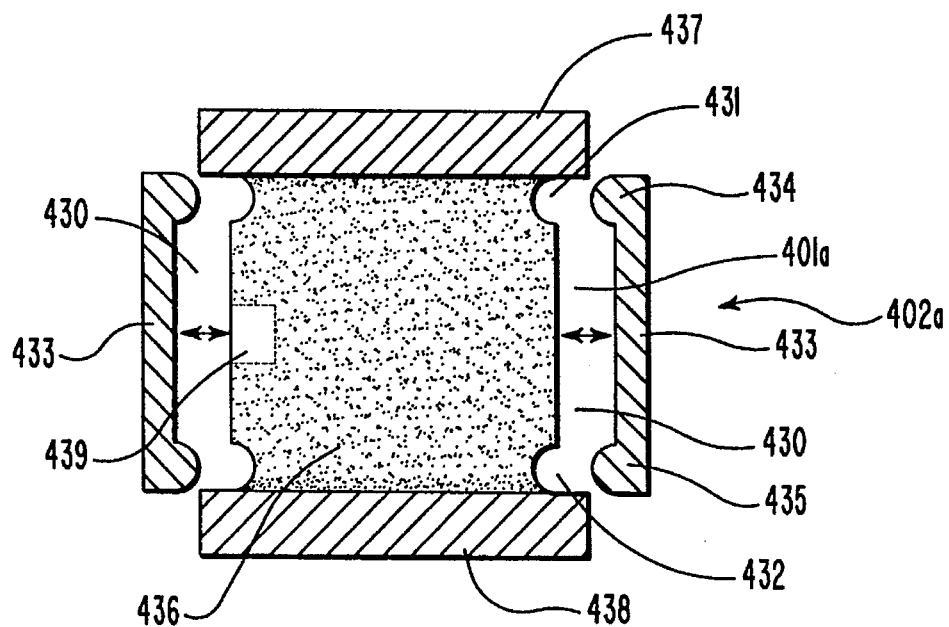
FIG. 4a depicts a cross section of the preferred top beam of the bicycle frame of FIG. 4 taken at 4a—4a, depicting a section of structural foam sandwiched between two sections of filament wound composite and reinforcing side members, with a cable channel shown in phantom.

Referring to FIG. 4a, a cross sectional view of the preferred bicycle frame at 4a—4a is shown. The Figure shows the channel 401a into which reinforcing side member 402a is installed. The preferred channel 401a includes a main channel 430 which has been routed to a first depth, and two secondary channels 431 and 432, each routed to a second depth where the second depth is greater than the first depth. The side reinforcing member 402a which may be installed into the channel 401a includes a main reinforcing member body 433 which is substantially flat on both sides and which is of a first thickness, and two protruding nubs 434 and 435 sized and shaped to fit into the secondary channels 431 and 432. Also shown in the Figure are the structural foam reinforcing layer 436 of the structural element, and the two preferred filament wound composite layers 437 and 438 between which the foam layer 436 is sandwiched. It is preferred that the channel 401a including the main channel section 430 and the secondary channels 431 and 432 be cut from the foam layer 436 so as to not disturb the structural integrity of the composite layers 437 and 438. As an option, a cable channel 438 is shown in phantom. The cable channel may be used to install cable such as gear shift cable, brake cable or other cable or components within the interior of the bicycle frame to maintain an attractive exterior of the bicycle frame and to enhance durability of the assembled bicycle by protecting the cable.

Figure 4B:
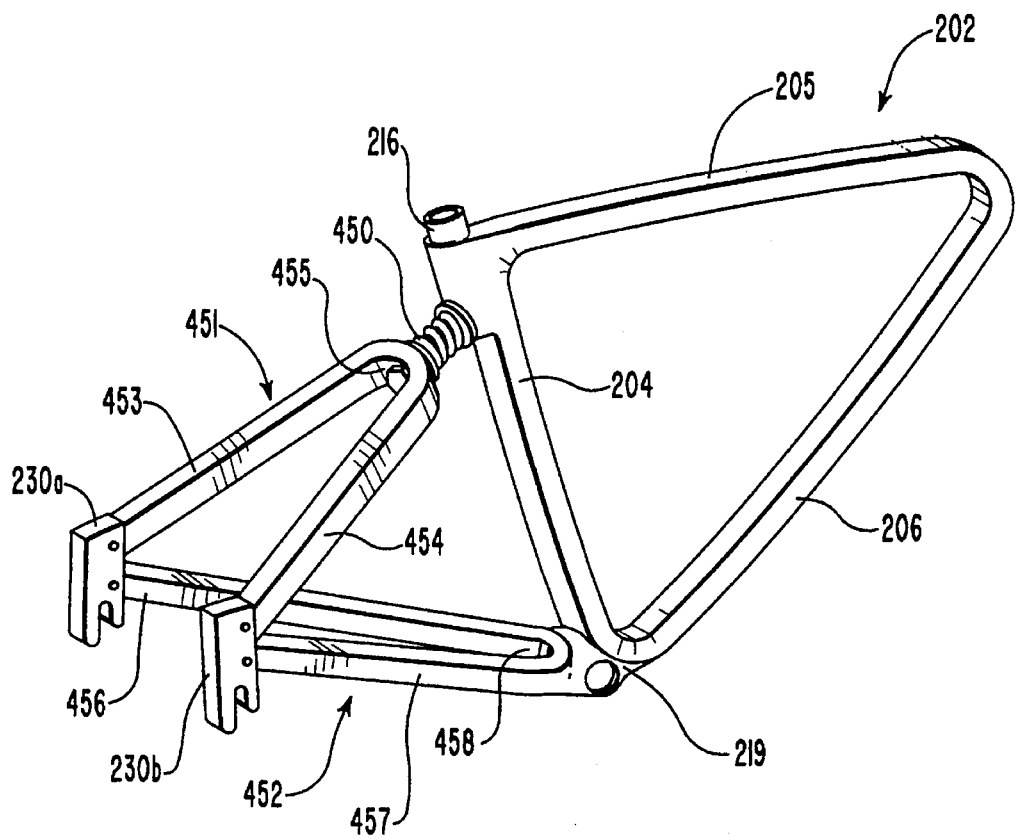
FIG. 4b depicts a perspective view of another bicycle frame of the preferred embodiment, such as frame that may be used for a mountain bicycle or other bicycles.
Figure 4C:
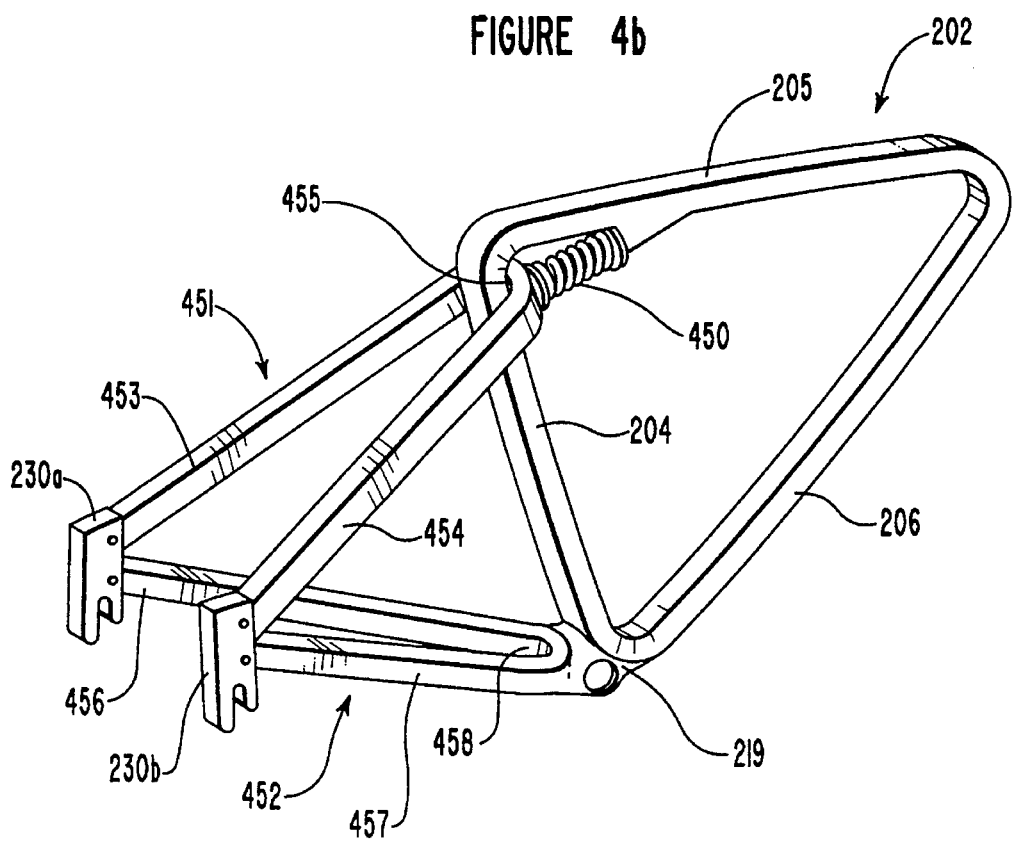
FIG. 4c depicts a perspective view of another bicycle frame of the preferred embodiment, such as frame that may be used for a mountain bicycle or other bicycles.

Referring to FIGS. 4b and 4c, two alternative preferred frames are depicted. Each includes a front structural element 202 and a pair of rear structural elements 451 and 452. It can be seen that the rear structural elements are oriented so that they each primarily consist of a generally v-shaped component, one installed above the other, with the upper structural element 451 installed at a greater angle to the top beam 205 than the lower rear structural element 452. The upper rear structural element 451 includes a left seat stay beam 453 extending from a drop out 230a to a mounting portion 455 and a right seat stay beam 454 extending from a drop out 230b to the mounting portion 455. In the preferred embodiment of FIG. 4b, the mounting portion is on the rear face of the seat beam 204 and is affixed thereto by known attachment means such as adhesive, bolting, etc., or by a shock absorber or spring apparatus 450. In the preferred embodiment of FIG. 4c, the mounting portion is on the front face of the seat beam 204 and is either affixed thereto by known attachment means such as adhesive, bolting, etc., it is affixed to either the seat beam 204 or the top beam 205 by a shock absorber or spring apparatus 450. The lower rear structural element 452 includes a left chain stay beam 456 extending from a drop out 230a to a mounting portion 458, and the right chain stay beam 457 extends from a drop out 230b to a mounting portion 458. It is preferred that the mounting portion 458 be affixed to the bottom bracket lug 219 or to the seat beam 204.

The preferred embodiment depicted in FIGS. 2 and 3 is a frame for a road bicycle and in FIGS. 4b and 4c is a frame for a mountain bicycle. In other embodiments of the invention, bicycle frames which vary from those shown in the Figures may be constructed, and frames or structural elements for other articles could be manufactured. It is envisioned that the invented structural elements and frames or other structures made from them will have use in a variety of fields, including for bicycles, tandem bicycles, multi-wheeled vehicles, all terrain vehicles, automotive, trucking, railway, aircraft, other transportation, building and construction, sporting goods, furniture, etc.

2.) Bicycle Fork

Figure 18:
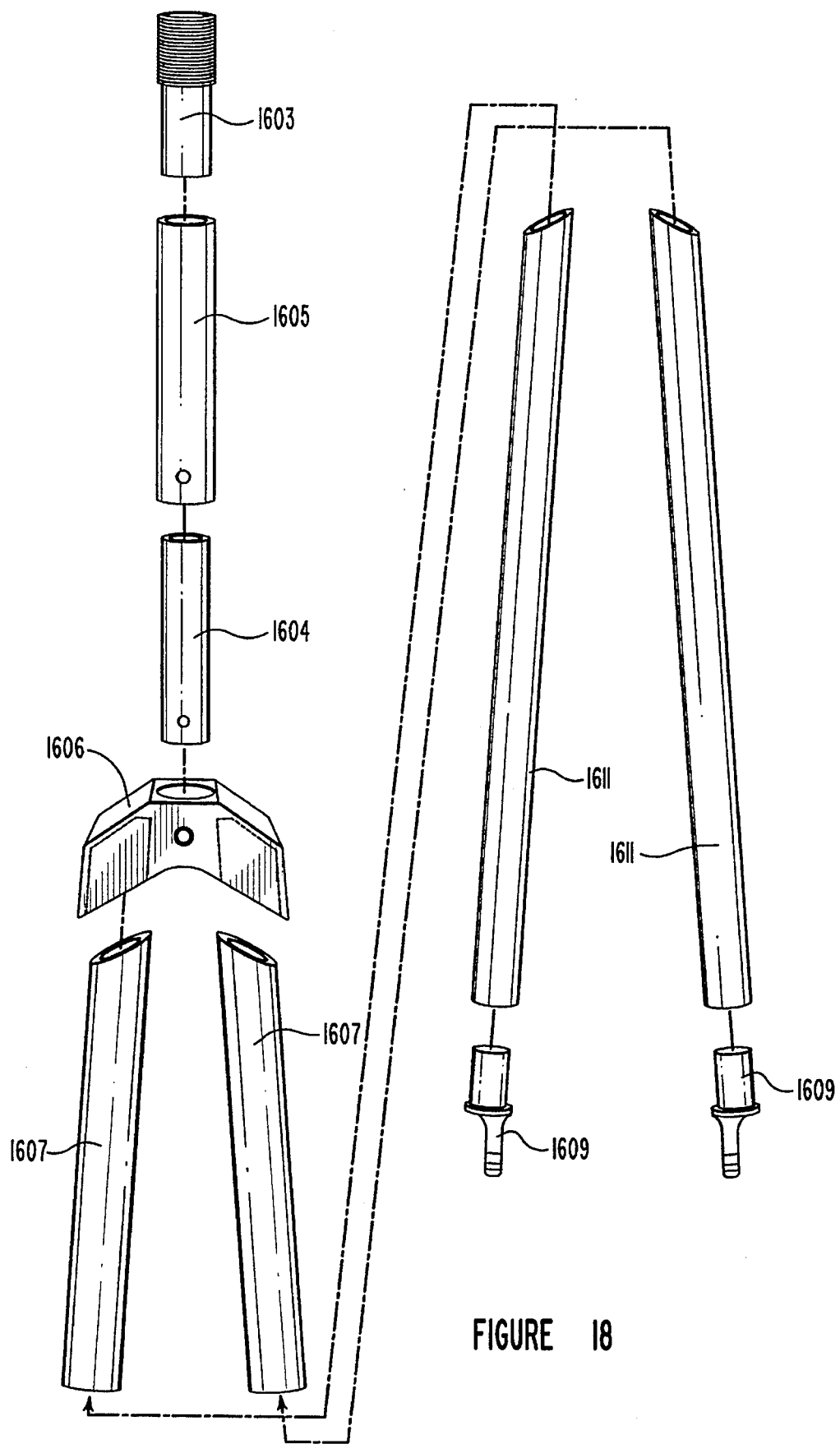
FIG. 18 is a parts explosion front view of the preferred bicycle fork.

Referring to FIGS. 16–18, the various components that comprise the preferred embodiment of the invented composite bicycle fork can be seen. The preferred embodiment of the invented bicycle fork 1601 includes a steer tube 1602 installed into a receptacle on the top of a crown 1606, two fork legs 1608 installed into receptacles on the bottom of the crown 1606, and front wheel drop outs 1609 on the bottom of each fork leg 1608. Portions of the steer tube 1602 depicted in these Figures include an upper insert section 1603 which in the preferred embodiment is made from 4130 steel although it would be possible to make it from other metals or composites, a main steer tube section 1605 which in the preferred embodiment is a composite component manufactured by filament winding, and a reinforcing sleeve 1604 installed within the main steer tube 1605 to serve a structure reinforcing function. The crown 1606 depicted is machined, milled, cast or forged from aluminum in the preferred embodiment, although it could be made from steel or other metal or from composite materials. The crown 1606 includes a receptacle for the steer tube 1602, two receptacles for the fork legs 1608, and a receptacle or hole 1610 for accommodating the mounting of a brake caliper. From the Figure it can also be seen that the fork legs 1608 in the preferred embodiment are each made from two or more sections of composite material, an upper fork half leg 1607 and a lower fork half leg 1611, with a tapering occurring along their length from the crown 1606 to the wheel drop outs 1609. In alternative embodiments, no tapering is provided. It is preferred that the upper fork half leg 1607 have a hollow passageway or receptacle in its lower end of sufficient size to permit insertion therein of the top end of the lower fork half leg 1611 and bond it therein. By using an upper fork half leg 1607 of greater diameter and/or greater wall thickness than the lower fork half leg 1611, a fork leg 1608 is achieved which is more flexible near the dropout 1609 than it is near the crown 1606. In the preferred embodiment, the upper fork half leg 1607 is tapered on its exterior so that although at its crown end it is of a greater diameter than the lower fork half leg 1611, at the junction of the upper fork half leg 1607 and the lower fork half leg 1611, the upper fork half leg 1607 has been tapered down to approximately the diameter of the lower fork half leg 1611. Such tapering can be accomplished by machining such as on a lathe, or other methods such as filament winding the upper fork leg 1607 with the taper already in it. In place of taper, stepping of the half leg is also possible. In alternative embodiments, the fork legs 1608 could each be made of a single piece of material rather than of two joined pieces. Also, the fork legs 1608 may be tapered all along their length, stepped along their length, straight walled, or with walls of varying thickness. Another preferred configuration for the fork legs includes fork legs that utilize three or more sections joined together. Varied flexibility along the fork leg can be achieved with such an arrangement. In such an embodiment, an internal fork leg reinforcing sleeve would likely be provided at the crown end of the fork leg. It is preferred that the fork legs 1608 be more flexible near the drop outs 1609 than near the crown 1606 to absorb road shock and vibration.

Figure 15:
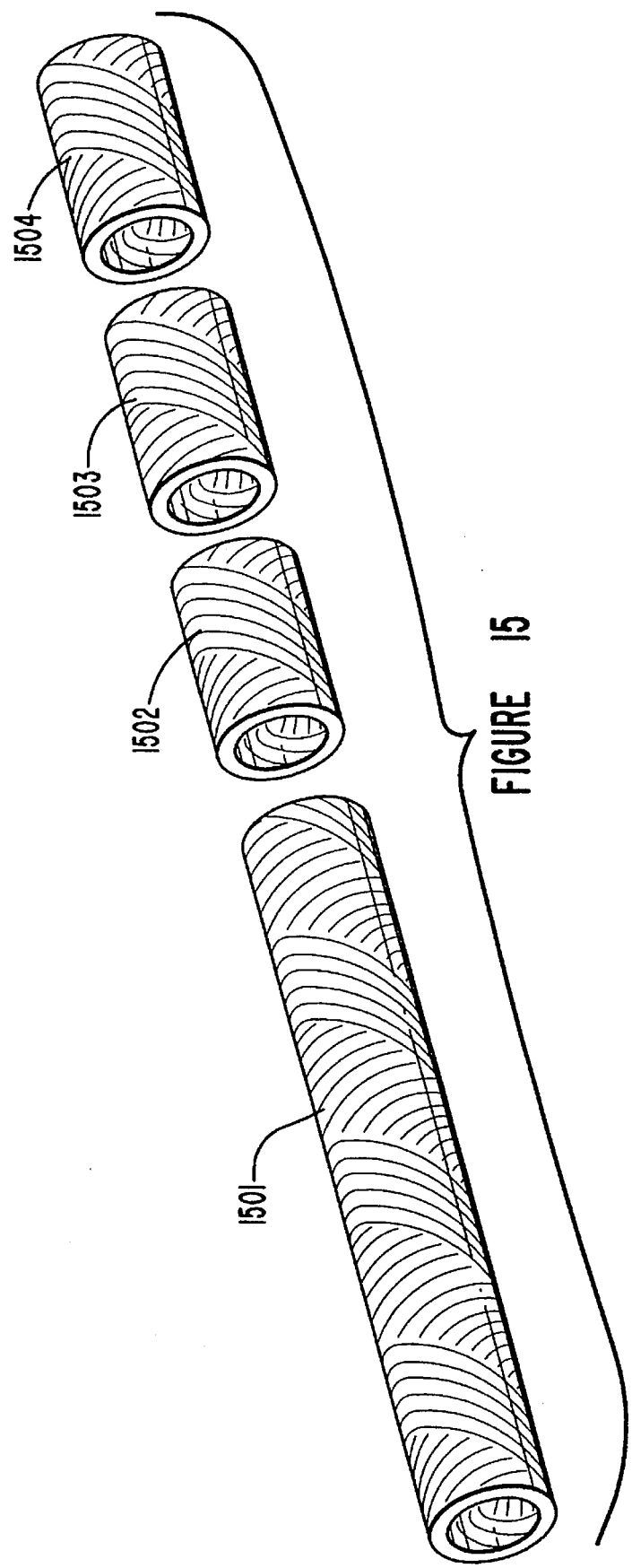
FIG. 15 depicts a section of filament wound tubing component stock and components such as fork legs cut therefrom.

In the preferred embodiment the upper fork half leg 1607, the lower fork half leg 1611, the main steer tube section 1605 and the sleeve 1604 are manufactured from composite materials. It is preferred to manufacture these components by a filament winding process because of the inherent strength and durability possible from a filament wound component, although other manufacturing methods mentioned herein could also be employed. Referring to FIG. 15a, it can be seen that these components may be manufactured as a length of component stock 1501 from which individual component lengths 1502, 1503 and 1504 are cut.

It is preferred that the upper fork half leg 1607 and the lower fork half leg 1611 are bonded using an aerospace grade 2 part epoxy adhesive although other joining techniques are possible as well. Other parts that must be joined include fork legs 1608 into crown 1606 receptacles, fork legs 1608 over drop outs, and steer tube 1602 into crown 1605 receptacle.

Referring to FIG. 17, a side view of the assembled bicycle fork is depicted. A vertical axis V is depicted, and it can be seen that the preferred fork exhibits some forward angle θ with respect to the vertical axis V. This angle will vary depending on bicycle dimensions and intended use, but in the preferred embodiment the angle is 6.25 degrees. Referring to FIG. 18, a parts explosion front view of the preferred bicycle fork is shown.

Figure 19:
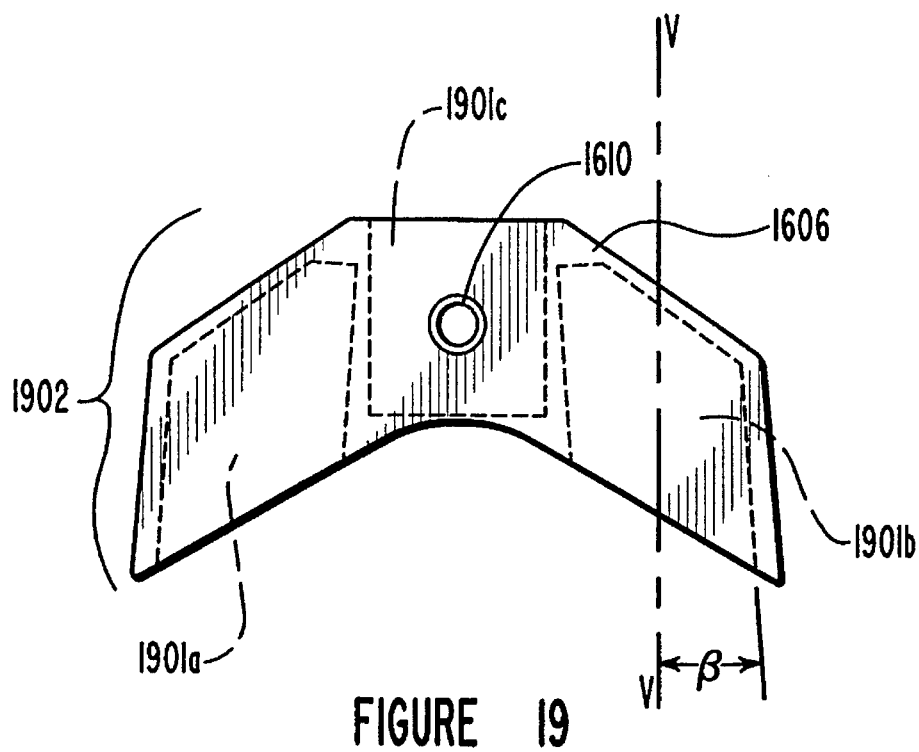
FIG. 19 is a front view of the bicycle fork crown of the invention with the steer tube receptacle and fork leg receptacles shown in phantom.

Referring to FIG. 19 which is a front view of the bicycle fork crown 1606 of the invention, the body portion 1902 of the crown 1606 can be seen into which two fork leg receptacles 1901a and 1901b are formed on a first or bottom side of the body portion 1902, and into which a steer tube receptacle 1901c is formed on a second or top side of the body portion 1902, the second side being opposite the first side. Also visible is a brake caliper mounting receptacle or hole 1610. It can be seen that the fork leg receptacles 1901a and 1901b are formed at an outward angle β to the vertical axis V in order to form a space between the fork legs into which a bicycle wheel may be installed. The preferred outward angle β is 4.38 degrees, although the amount of angle will vary in different embodiments of the invention. The preferred crown is manufactured from 7075-T6 aluminum, although it could be manufactured from other materials as well.

Figure 20:
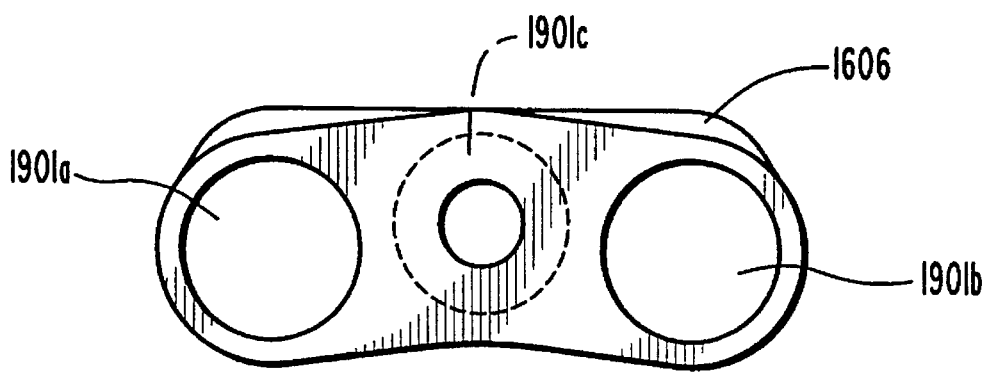
FIG. 20 is a bottom view of the bicycle fork crown of the invention with the fork leg receptacles shown and with the steer tube receptacle shown in phantom.

FIG. 20 is a bottom view of the bicycle fork crown 1606 of the invention. The fork leg receptacles 1901a and 1901b are visible along with the steer tube receptacle 1901c shown in phantom.

Figure 21:
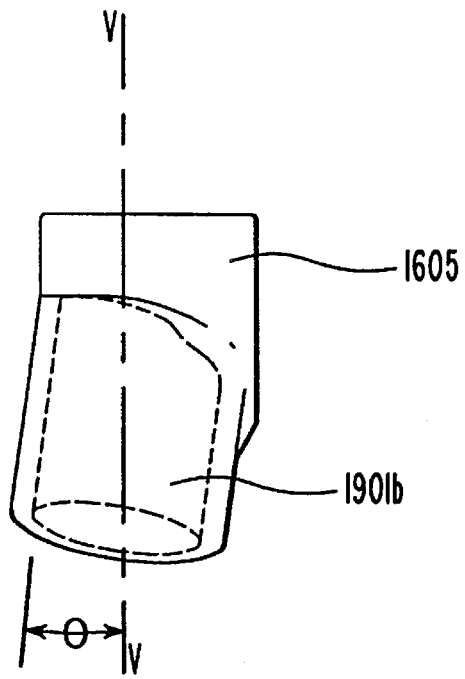
FIG. 21 is a left side view of the bicycle fork crown of the invention with the left fork leg receptacle shown in phantom.

FIG. 21 is a left side view of the bicycle fork crown of the invention. The left fork leg receptacle 1901b is shown in phantom.

Figures 22, 23:
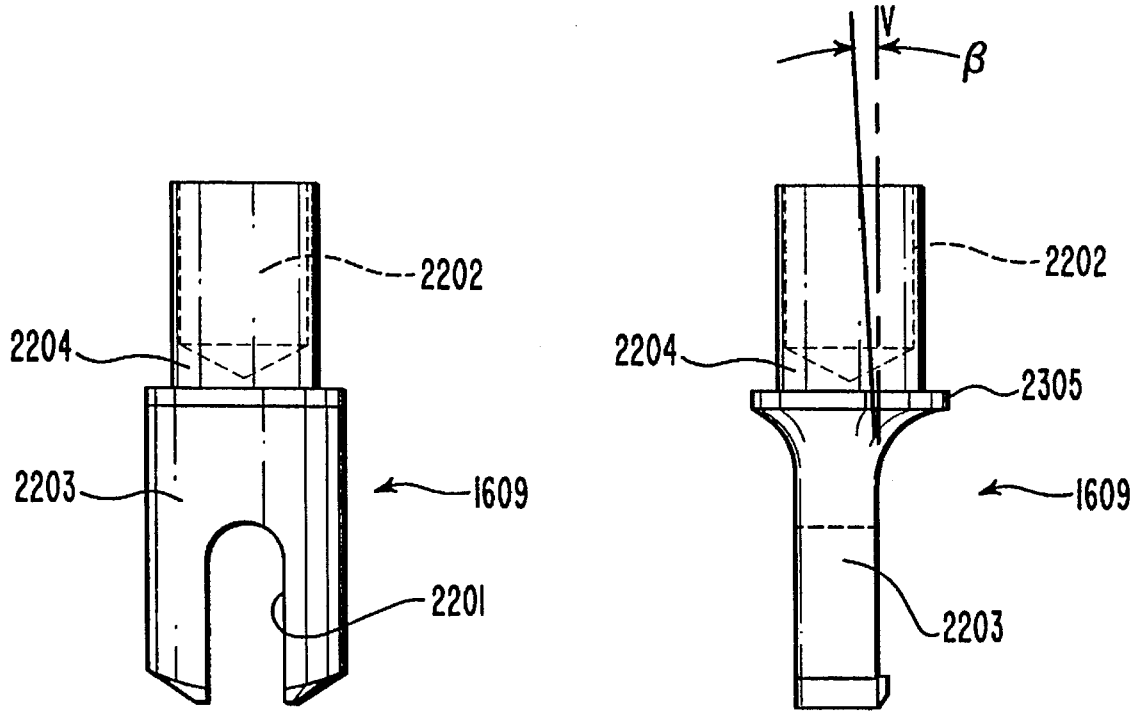
FIG. 22 is a left side view of the bicycle front wheel drop out of the invention.
FIG. 23 is a front view of the right bicycle front drop out of the invention.

FIG. 22 is a side view of the bicycle front wheel drop out 1609 of the invention. The preferred drop out 1609 depicted has an upper body portion 2204 and a lower body portion 2203. The upper body portion 2204 typically inserts into a fork leg for mounting thereon. A cavity 2202 is provided to reduce the weight of the drop out 1609. The lower body portion 2203 includes a generally vertical slot 2201 into which a bicycle axle may be installed.

FIG. 23 is a front view of the bicycle front wheel drop out 1609 of the invention. The upper body portion 2204, lower body portion 2203 and the cavity 2202 can be seen. Also visible is a protruding rim 2305 against which a fork leg may abut when installed over the drop out 1609. It should be noted that the upper body portion 2204 is at an angle β to the vertical axis V to compensate for the same amount of angle β of the leg receptacle 1901b in the crown 1606.

Figure 24:
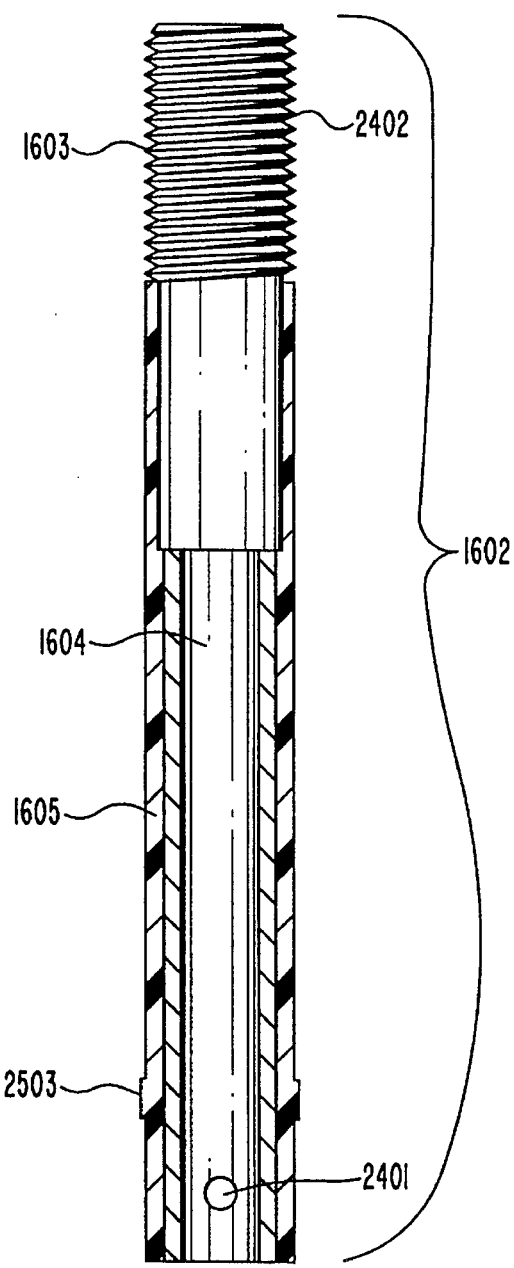
FIG. 24 is a front view of the assembled steer tube of the invention, with main steer tube section, upper insert section, and reinforcing sleeve depicted.
Figure 25:
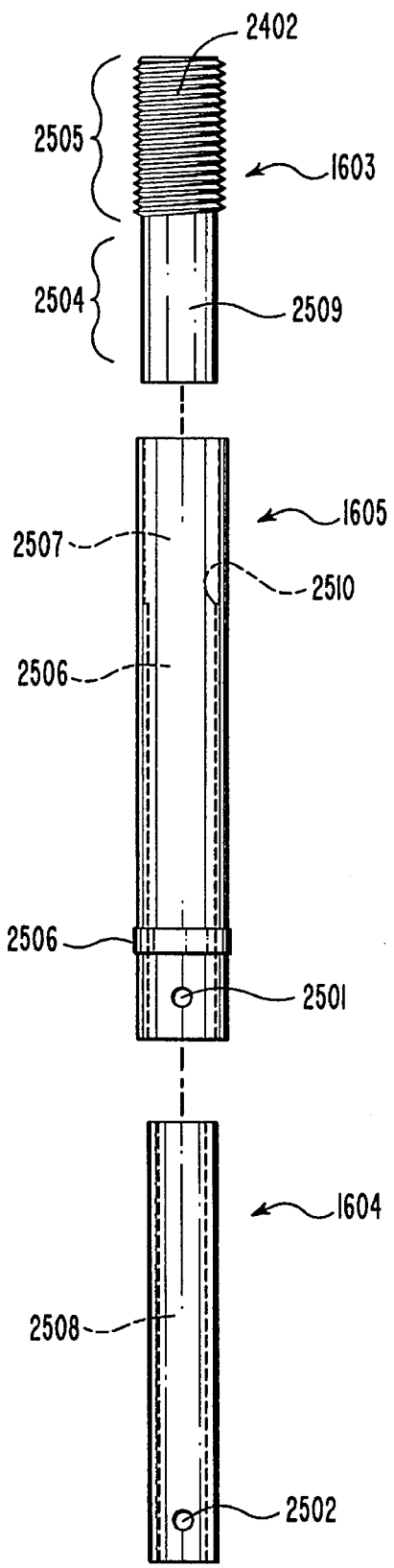
FIG. 25 is a front view parts explosion of the steer tube of the invention, with main steer tube section, upper insert section and reinforcing sleeve depicted.

FIG. 24 is a front view of the preferred steer tube 1602 of the invention. FIG. 25 is a front parts explosion view of the same. The preferred steer tube 1602 includes an upper insert portion 1603 which is installed in the upper passageway 2507 of the main steer tube 1605. The lower section 2504 of the upper insert 1603 inserts into a first passageway 2507 and the upper section 2505 of the insert 1602 remains protruding from the main steer tube section 1605. The upper section 2505 of the upper insert 1603 includes threads 2402. The main steer tube section 1605 also includes a second passageway 2506 of smaller diameter than the first passageway 2507, the juncture of the first passageway 2507 and the second passageway 2506 forming a ridge 2510 against which the upper insert portion 1603 can abut when installed. The reinforcing sleeve 1604 is installed into the second passageway 2506 so that it abuts the installed upper insert portion 1603. The reinforcing sleeve 1604 is used to add strength and stiffness to the steer tube 1602. The sleeve 1604 has an internal passageway 2508 to eliminate excess material and to keep it light. The main steer tube section 1605 includes a protruding rib about its exterior intended to abut against the crown 1606 when installed therein. The assembled steer tube includes a hole 2401 which is the alignment of hole 2501 of the main steer tube 1605 and the hole 2502 of the sleeve 1604, the hole 2401 being intended for insertion of a bolt for anchoring of the front brake caliper. In the preferred embodiment, the main steer tube 1605 and the sleeve 1604 are made from composite materials, preferably by a filament winding process, and the upper insert portion 1603 is made from steel although other materials could be used to manufacture these components.

Figures 26, 27, 28:
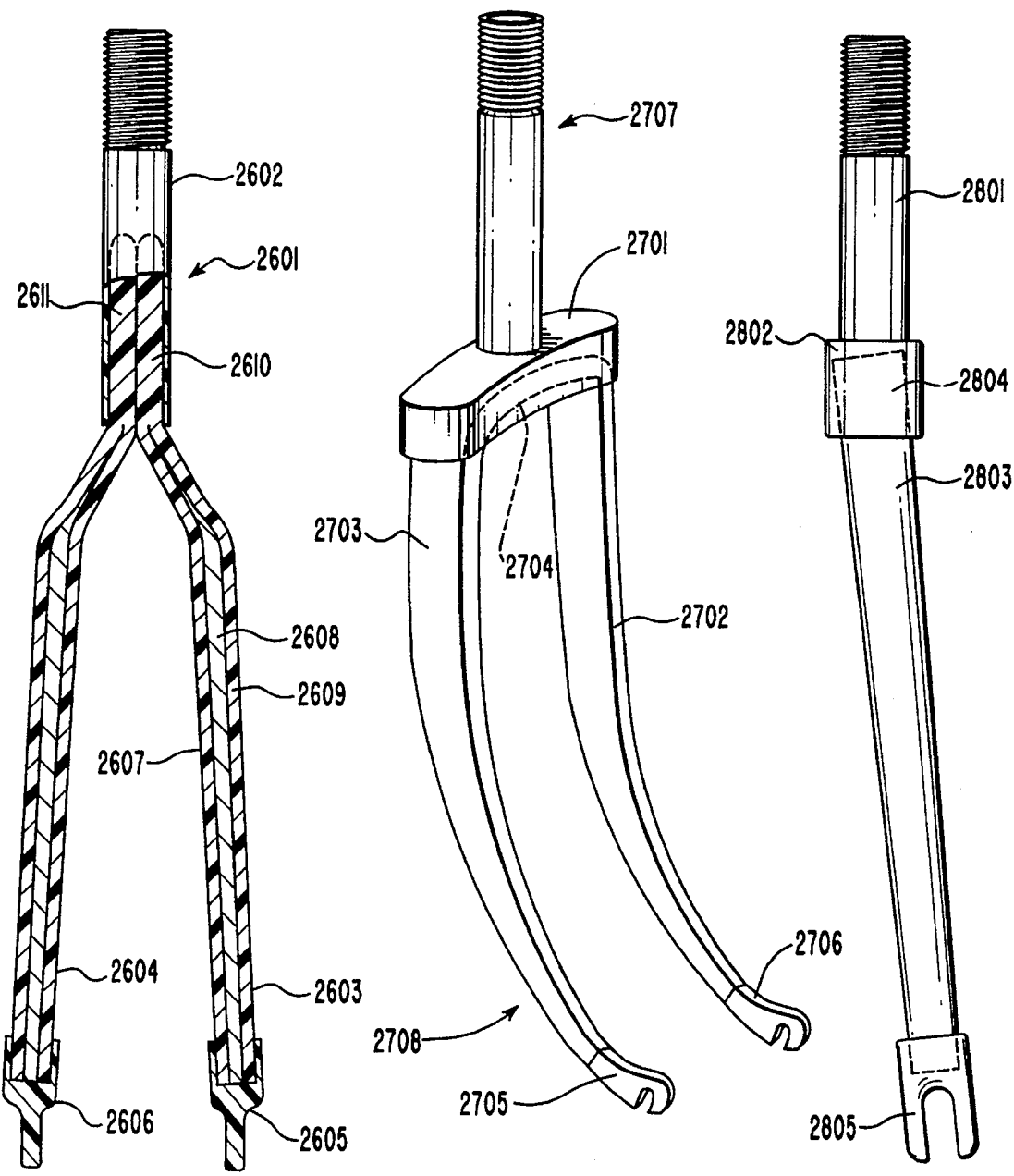
FIG. 26 is a front view of an invented fork which has been made by the invented net shape filament winding process.
FIG. 27 is a perspective view of another invented fork which has been made by the invented net shape filament winding process.
FIG. 28 is a side view of an invented fork which has been made by the invented net shape filament winding process.

Referring to FIGS. 26, an alternative preferred bicycle fork 2601 is depicted. The fork 2601 includes a unique steer tube 2602 because it has fork legs 2603 and 2604 mounted directly in it without the need for a traditional crown. Drop outs 2605 and 2606 are also depicted. The Figure is a front view cut-away so that the interior structure of the fork 2601 can be observed. Each fork leg 2603 and 2604 includes a first thickness of a resin matrix and reinforcing fiber 2607, a second thickness of structural foam 2608, and a third thickness of resin matrix and reinforcing fiber 2609. This structure is manufactured via the process described below. It can also be seen that the fork legs each terminate in an installation protrusion 2610 and 2611 each of which install into the steer tube 2602 to form a complete fork 2601.

Referring to FIG. 27, a perspective view of another invented bicycle fork is shown. The fork 2707 includes a unitary fork leg member 2708 that has a left fork leg 2702 extending from a drop out 2706 to a central mounting portion 2704, and from the central mounting portion 2704 along a right fork leg 2703 to a drop out 2705. Thus, the fork leg unit 2708 is continuous from drop out to drop out and is affixed to the crown by mounting portion 2704 by any adequate mounting means such as bonding, the use of fasteners, etc. The preferred embodiment of this fork uses the construction described with respect to FIG. 26 that includes a layer of structural foam between two layers of composite material. In alternative embodiments, the structural foam may be omitted, but it is preferred that the foam be included to achieve desired rigidity at a low weight. It should be noted that this fork is depicted as being manufactured in FIGS. 10a and 10b.

Referring to FIG. 28, a side view of an invented bicycle fork 2801 is shown. The fork 2801 includes drop out 2805, crown 2803, crown mounting receptacle 2804 and leg member 2803. This figure represents a side view of the fork that would result from manufacturing the fork of FIG. 27 with straight legs but with the fork leg unit 2708 installed in the crown 2701 at a forward angle. This figure also represents a side view of the fork that would result from manufacturing the fork of FIG. 26 absent the installation protrusions 2610 and 2611 and instead joining the legs 2603 and 2604 in a crown. It is preferred that each of the forks exhibit more flexibility near its wheels than near its crown.

It should be noted that the invented fork and components thereof, although described with respect to use on a bicycle, could be used on any two or three wheeled vehicle, including but not limited to motorcycles and all terrain vehicles.

B. Net Shape Filament Winding Manufacturing Process

1.) Process for Manufacturing a Bicycle Frame

Figure 5:
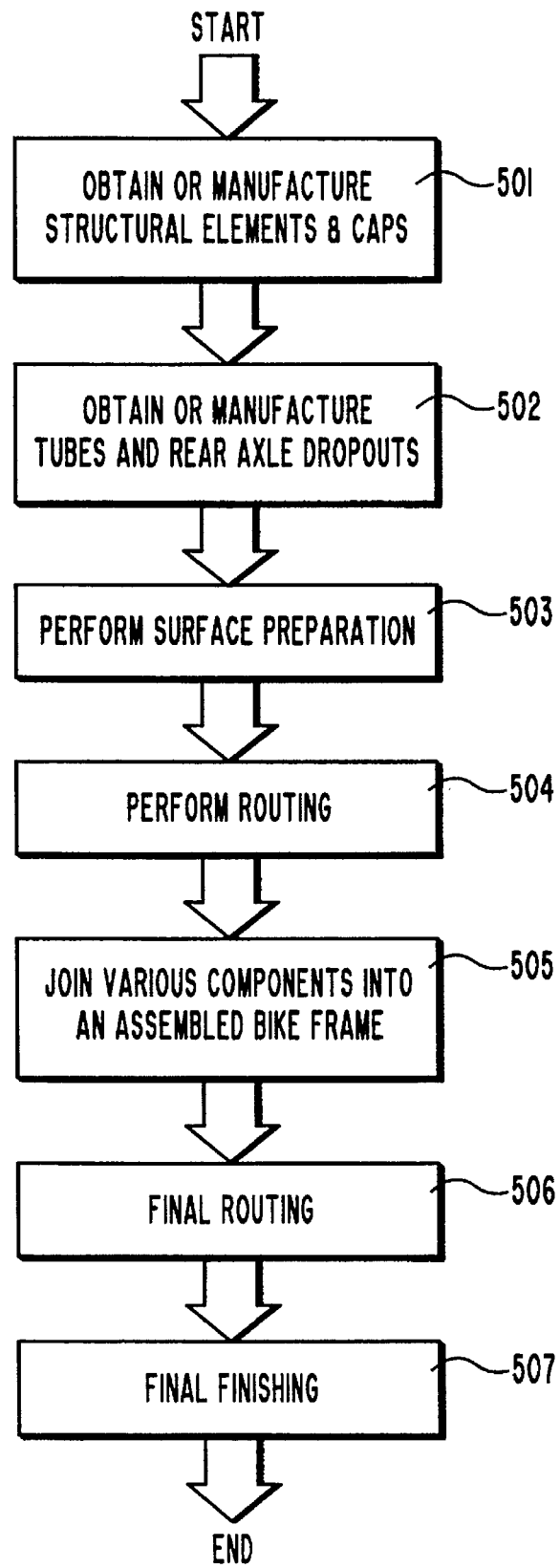
FIG. 5 depicts steps of the invented method for manufacturing bicycle frames.

Referring to FIG. 5, basic steps of the invented process for manufacturing a bicycle frame are outlined. Those steps include obtaining or manufacturing a front and rear structural elements and caps 501. The preferred structural elements and caps are obtained by employing the invented net shape filament winding process described below. However, in the invented process for manufacturing a bicycle frame, the structural elements and caps do not necessarily need to be manufactured by filament winding. It is possible to manufacture structural elements by injection molding, roll wrapping, lay-up, braiding and pultrusion. It should also be noted that in the preferred embodiment, two rear structural elements are employed, although it is possible to manufacture a bicycle frame with only one rear structural element if the rear structural element is carefully chosen. Further, in the preferred embodiment, the front and rear structural elements are three-sided elements with rounded corners. Of course it would be possible to employ the invented process with any of a variety of shaped structural elements mentioned above, or others.

The second step of the invention is to obtain or manufacture the rear axle dropouts, head tube, seat tube and bottom bracket tube 502. In the preferred embodiment, the rear axle dropouts are standard aluminum alloy parts which are milled from plate or cast or forged into the desired shape. The preferred bottom bracket tube is standard aluminum tube. The preferred head tube and seat tube are filament wound graphite/epoxy composites, although any known prior art tubing (including but not limited to metal and composites) could be used, absent strength to weight ratio considerations.

The third step 503 is to perform surface preparation of the various components prior to assembly. This may include sanding, grinding, filing, filling. In particular, any composite surfaces that are to be bonded must be clean and adequately prepared to ensure full bond strength.

The fourth step 504 is to perform any routing or cutting of channels into the components which will be the assembled frame. In the preferred embodiment, as described below in the discussion concerning FIG. 4a, the front and rear structural elements will include a top layer of filament wound composite, a bottom layer of filament wound composite, and a layer of structural foam sandwiched between them. It is preferred to cut or rout a channel or track about the left and right sides of the front structural components to act as a receptacle for the installation of side reinforcing members therein. It is also preferred to cut or rout tracks in the various frame components into which gear shift and brake cables will be placed at the time of assembly of a completed bicycle.

The fifth step 505 is to assemble the various components which comprise the bicycle frame. In the preferred embodiments of the invented manufacturing processes, joining of most parts is accomplished by adhesively bonding such parts together, such as by the use of common two-part epoxy adhesive (following adequate preparation and cleaning of the surfaces to be bonded). Depending on the adhesive utilized, it may be necessary to expose the epoxy to heat to achieve full cure and desired bond strength. It is also possible to assemble the parts by the use of glue, adhesive tape, welding, bolting, riveting, or screwing. In the preferred embodiment, the rear axle drop outs are both bonded and reinforced with the use of bolts. In other embodiments the manufacturer may choose to reinforce bonded parts with fasteners such as bolts, rivets, screws, pins, clamps or other fasteners. Depending on the application, the manufacturer may choose to join various components with any of a variety of methods as listed above or otherwise.

Joining the various components into a bicycle frame includes joining the front and rear structural elements. In the preferred embodiment, the protrusions of the rear structural elements are joined to the generally vertical seat beam of the front structural element so that the rear structural elements are spaced apart sufficiently to permit placement of a bicycle wheel between them. This is done by cutting or routing an angled edge on the protrusions of the rear structural elements to achieve angled and spaced-apart installation. It should also be noted that in bicycle frame design, the actual angle of the various seat beams from the vertical tends to vary. For purposes of discussion herein, the term "generally vertical" shall mean having an angle of departure from a vertical line of 45 degrees or less. Similarly, "generally horizontal" shall mean having an angle of departure from a horizontal line of 45 degrees or less. Also to be joined are the head tube and head tube cap to the front structural element at the intersection of the top beam and the down beam; the seat tube and seat tube cap at the intersection of the top beam and the seat beam and just above the seat stays of the rear structural elements; the rear axle drop outs at each of the intersections of the chain stay and seat stay of each of the rear structural elements; and the bottom bracket tube and bottom bracket cap at the intersection of the seat beam, down beam, and chain stays.

The next step 506 is to round or smooth any sharp corners or rough edges of the assembled bicycle frame such as by routing, grinding, filing or sanding. This step is performed to minimize weight, for aesthetic purposes and to eliminate sharp points or edges which may prove dangerous.

Finally, final finishing 507 of the bike frame is performed. This may include further sanding, grinding, filing, patching and filling as well as the application of paint, varnish and graphics. In the preferred embodiment, the frame is coated with a lustrous clear coat finish to provide a high gloss, high technology look which permits the attractive filament pattern of filament wound parts to be observed. Included in this step will be the attachment of water bottle brackets, cable brackets and derailleur mounting brackets.

It should be noted that the steps listed herein need not be performed in the exact order listed, and some steps may be intermixed with other steps.

2.) Generalized Net Shape Filament Winding Process

Figure 6:
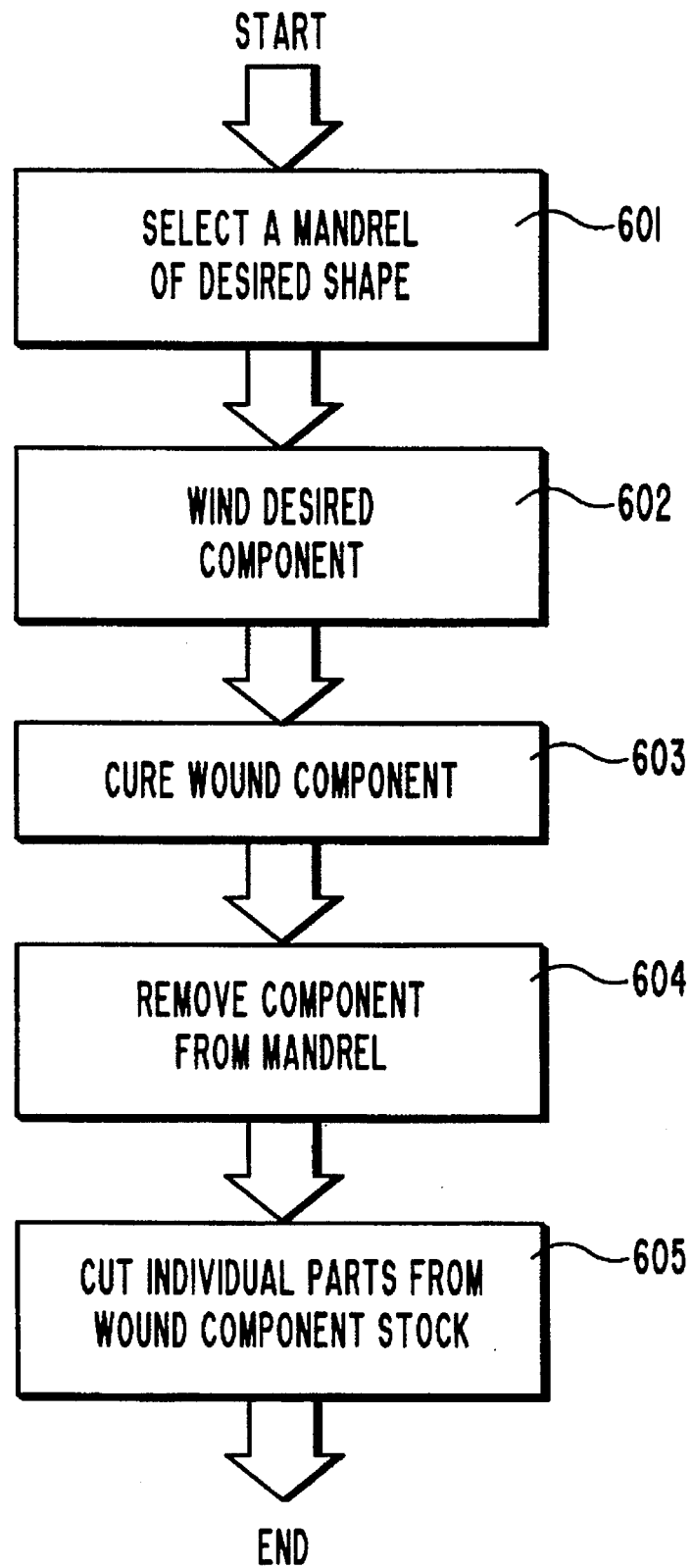
FIG. 6 depicts steps of the invented net shape filament winding manufacturing process.

Referring to FIG. 6, basic steps of the invented net shape filament winding manufacturing process are outlined. The steps as outlined in FIG. 6 and as described in detail below use the illustrative example of manufacturing a bicycle frame and to some degree overlap the steps described with respect to FIG. 5, but in other embodiments of the invention, the invented process could be used for the manufacture of a wide variety of articles, such as furniture, structural members for various transportation applications (automotive, motorcycles, tractor trailer rigs, etc.), construction, bicycle components (bar ends, handle bars, spokes, cranks), fencing, and beams for numerous applications.

Figure 7A:
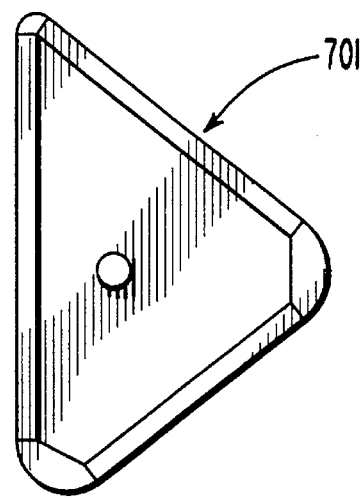
FIG. 7a depicts a side view of a preferred collapsible three-sided mandrel used to manufacture three-sided structural elements of the preferred embodiment of the invented bicycle frame.
Figure 7B:
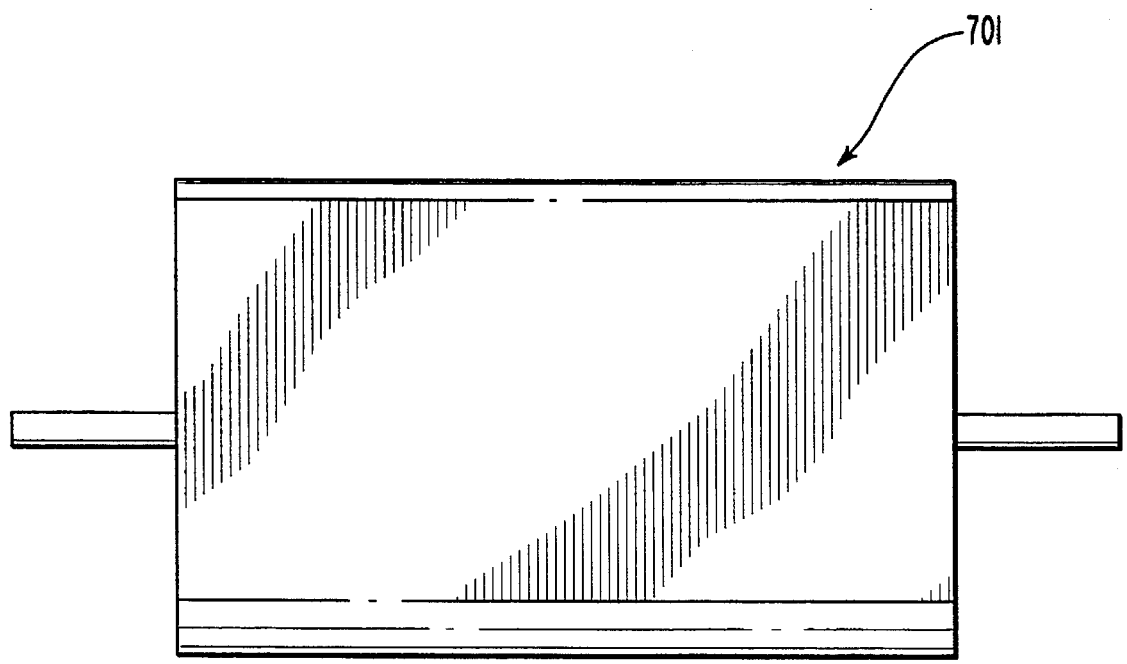
FIG. 7b depicts a front view of a preferred collapsible three-sided mandrel used to manufacture three-sided structural elements of the preferred embodiment of the invented bicycle frame.

In FIG. 6, the first step 601 is to select a mandrel of a desired shape for filament winding a quantity of structural element stock or cap stock. In the preferred embodiment of a bicycle frame, as described above and as depicted in the various Figures, the front structural element of the frame is three-sided with rounded corners. The rear structural elements are three sided with one of the sides partially cut out. A three-sided mandrel with rounded corners is preferred to make such structural components. Referring to FIGS. 7a and 7b, a side view and front view of such a three-sided mandrel 701 shown respectively, the mandrel being of the type usable on prior art filament winding machines. It should be noted that the size and geometry of mandrel will differ for various applications. Appropriate mandrels can be manufactured from a wide range of materials including wood, sheet metal, metal plate and rod in various shapes and combinations. The primary function of the mandrel is to provide an internal form to wind the fibers or place the materials on to serve as the basis for the resulting shape following the curing of the wound composite. Of course the outside dimensions will be the inside dimensions of the wound part. It is preferred that the mandrel be able to be disassembled following curing so that it may be removed from the wound part without damaging it. Such a mandrel is referred to as a "collapsible winding mandrel" due to its ability to be disassembled and collapsed within the wound part. In other preferred embodiments of the invention, mandrels of other shapes are used. For example, the bicycle forks of FIGS. 26–28 can be made by selection of a mandrel of the appropriate shape.

Figure 8:
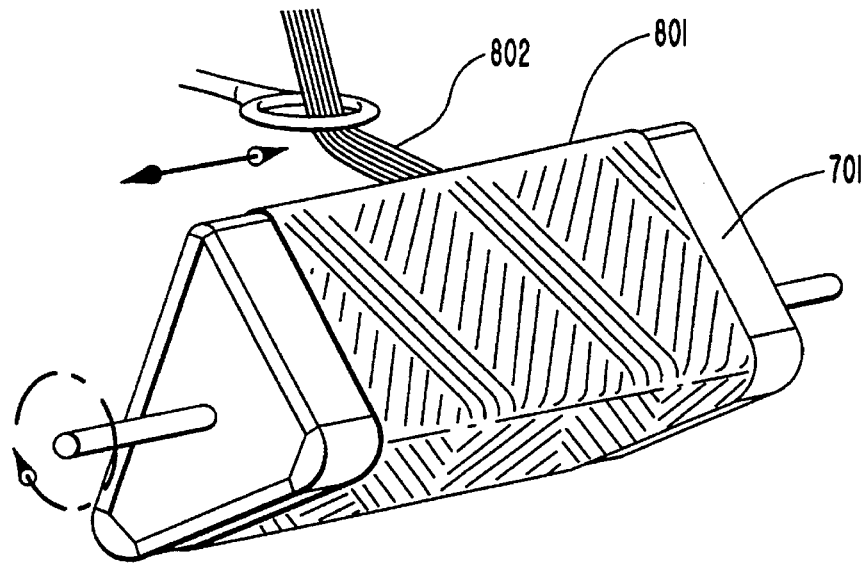
FIG. 8 depicts a perspective view of filament winding a section of structural element stock on the preferred mandrel.

The next step 602 is to filament wind onto the chosen mandrel 701. Referring to FIG. 8, it can be seen that the chosen mandrel 701 is being used to wind structural element stock 801 with a typical prior art filament winding machine. As the mandrel 701 rotates, resin-impregnated filament 802 is wound onto the mandrel 701, resulting in the structural element stock 801.

The next step 603 is to cure the filament wound structural element stock 801. Typically this is performed with the wound component still on the mandrel. Required curing will vary according to the materials being used, but generally curing will involve heating and then cooling the wound component over a period of time.

Figure 9:
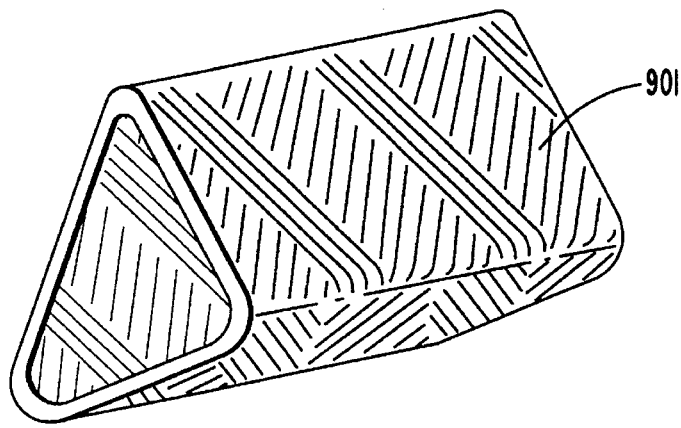
FIG. 9 depicts a perspective view of a cured section of structural element stock which has been removed from the mandrel.

The next step 604 is to remove the cured wound component 801 from the mandrel 701. Because a collapsible mandrel is used in the preferred embodiment, this is readily performed by disassembling the mandrel 701 and, referring to FIG. 9, removing it from the structural element stock 901.

Figure 10:
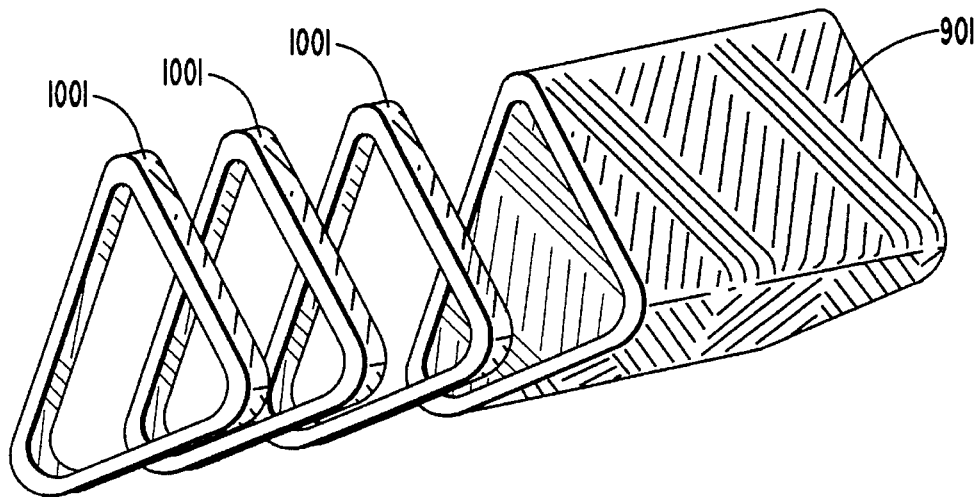
FIG. 10 depicts a perspective view of cutting structural element members from a length of structural element stock.

The next step 605, referring to FIG. 10, is to cut individual components, in this case three-sided structural elements 1001 for bicycle frames, from the wound component or structural element stock 901. Cutting may be performed by any prior art cutting apparatus, such as a band saw, disc, circular saw, water jet, etc. The result is a plurality of three-sided structural elements which may readily be assembled in bicycle frames.

The above description used the manufacture of three-sided bicycle frame structural elements as an illustrated example. A three-sided mandrel with rounded corners was used to filament wind three-sided structural element stock, and from that stock, three-sided structural elements were cut. Alternatively, mandrels of any shape could be used and components of any desired configuration could be cut from them.

Referring now to FIGS. 10a, 10b, 11–14 and 15a it can be seen that the same net shape filament winding process may be employed to manufacture the head tube cap, seat tube cap, bottom bracket cap, steer tube elements and fork legs of the invention.

Figure 10A:
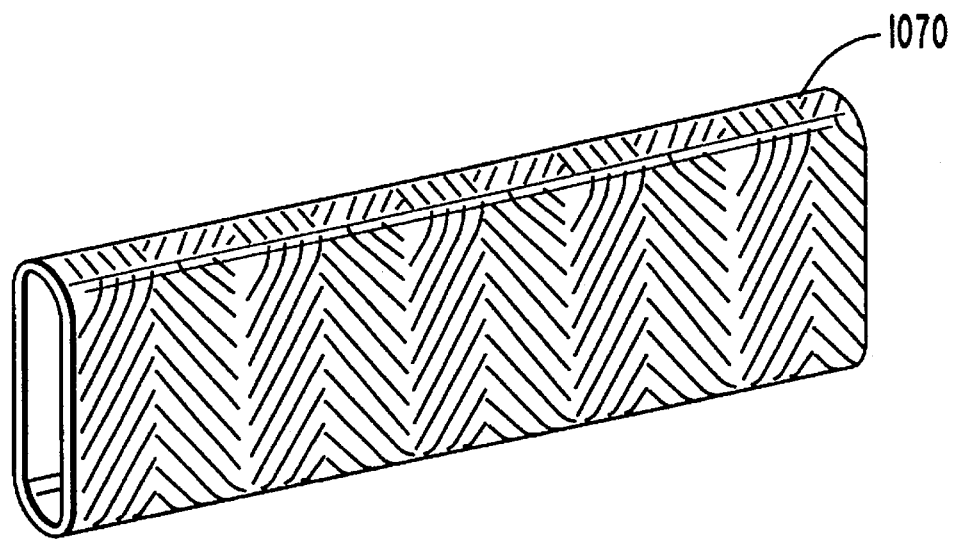
FIG. 10a depicts a perspective view of structural element stock that is used to manufacture bicycle forks in one preferred embodiment of the invention.
Figure 10B:
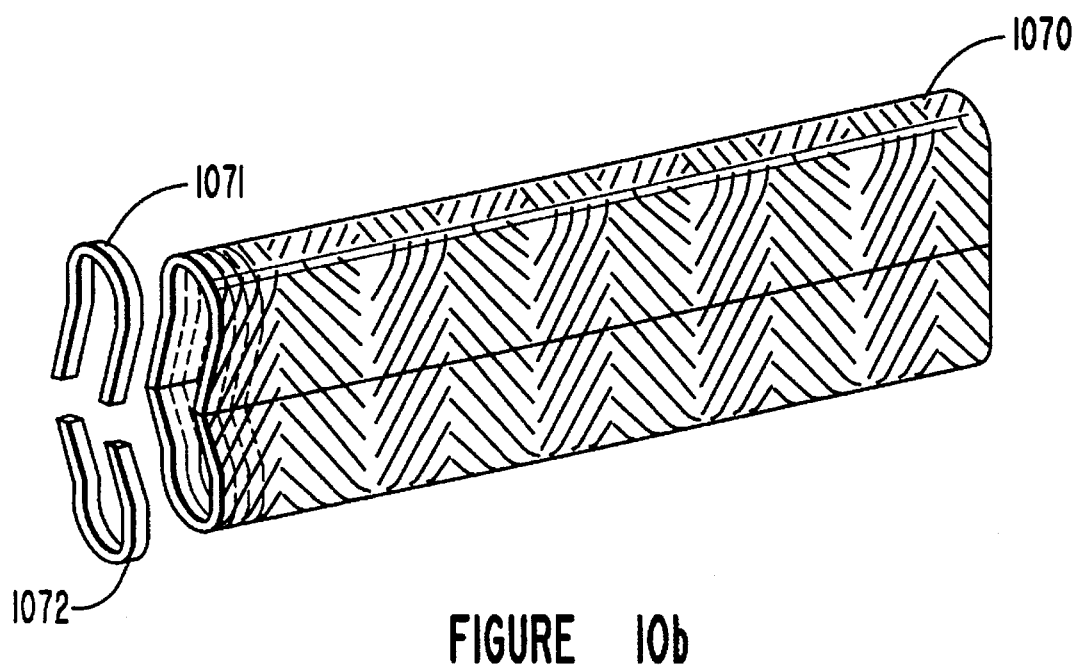
FIG. 10b depicts cutting bicycle fork components from a piece of structural component stock.

In FIGS. 10a and 10b, it can be seen that by proper selection of mandrel shape, the unitary bicycle fork leg unit of FIG. 27 can readily be manufactured in large quantities. Fork leg units 1071 and 1072 are cut from the fork leg stock 1070 two high, resulting in little or no material waste and a very efficient cutting process. The fork legs of FIGS. 26 and 28 could be similarly manufactured by appropriate selection of mandrel shape and cutting pattern.

Figure 11:
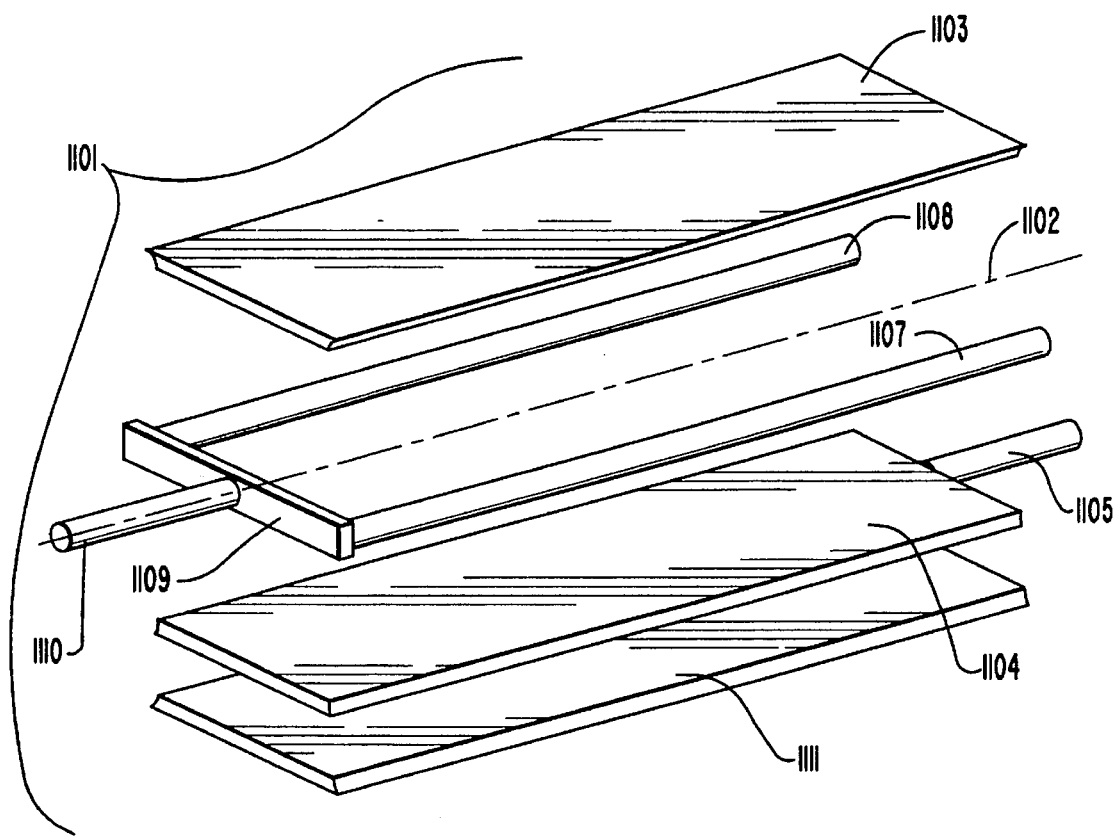
FIG. 11 depicts an exploded view of a collapsible mandrel of the invention which is used to filament wind lengths of cap stock.

In FIG. 11, a collapsible winding mandrel 1101 useful for manufacturing a quantity of cap stock is shown. It can be seen that the mandrel 1101 comprises numerous components which can be readily disassembled. The mandrel 1101 includes a longitudinal axis 1102, a rectangular top plate 1103, a rectangular mid plate 1104 with protrusion 1105 for mounting in a filament winding machine, and two elongate rounded sides 1107 and 1108 attached to an end piece 1109 with protrusion 1101, and a bottom plate 1111. Thus, in three dimensions the mandrel 1101 is generally rectangular with rounded sides on each side of its longitudinal axis, with a flat top and flat bottom.

Figure 12:
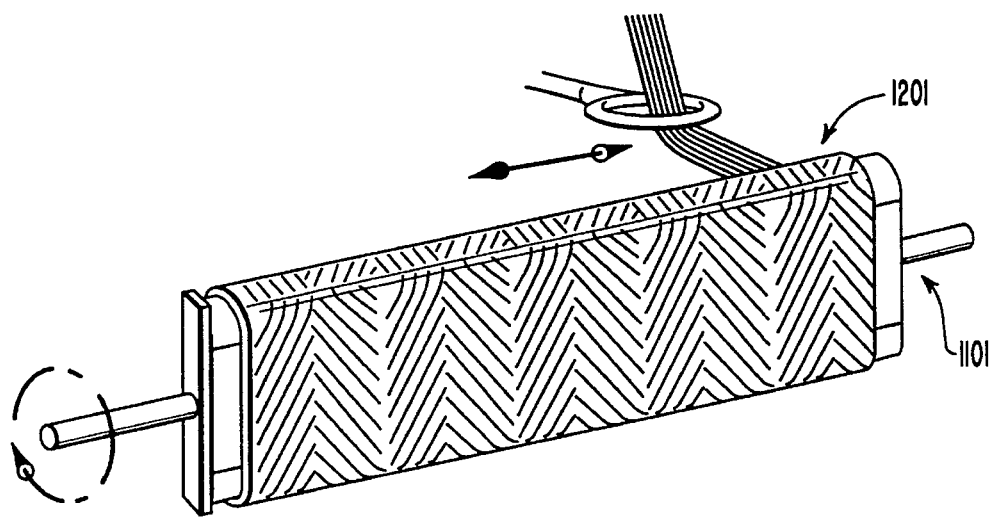
FIG. 12 depicts filament winding of a section of cap stock on the collapsible mandrel of FIG. 11.

In FIG. 12, the use of the mandrel 1101 to filament wind a quantity of cap stock 1201 can be seen. When filament winding of the cap stock 1201, the cap stock 1201 is cured by any of a variety of prior art curing techniques. Then the mandrel 1101 is removed from within the cap stock 1201.

Figure 13:
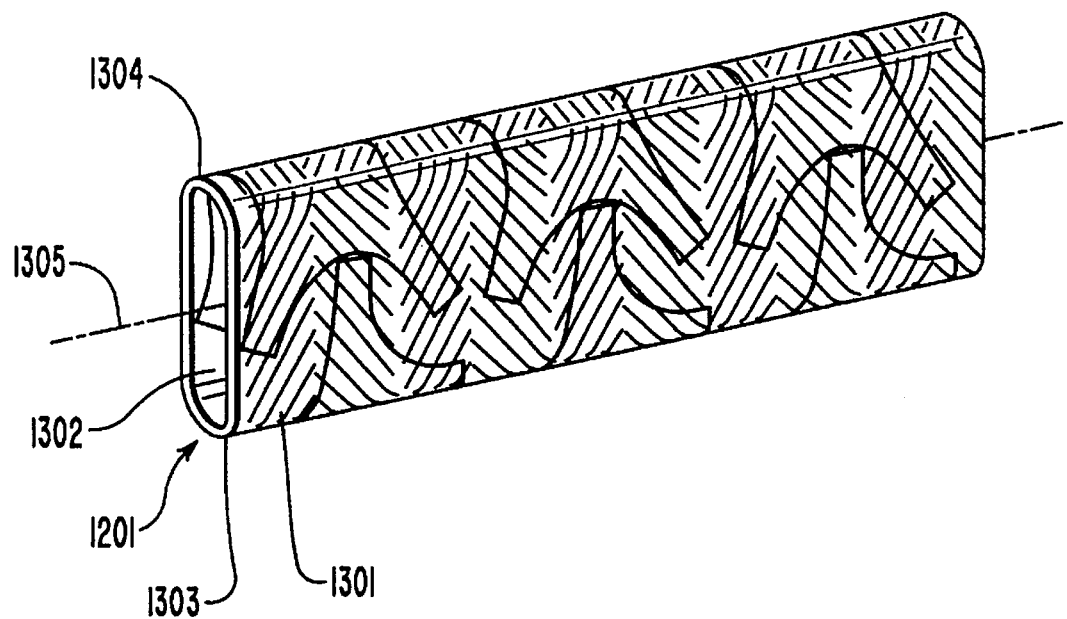
FIG. 13 depicts a section of cured cap stock prior to cutting caps from it, with cap outlines drawn thereon.
Figure 14:
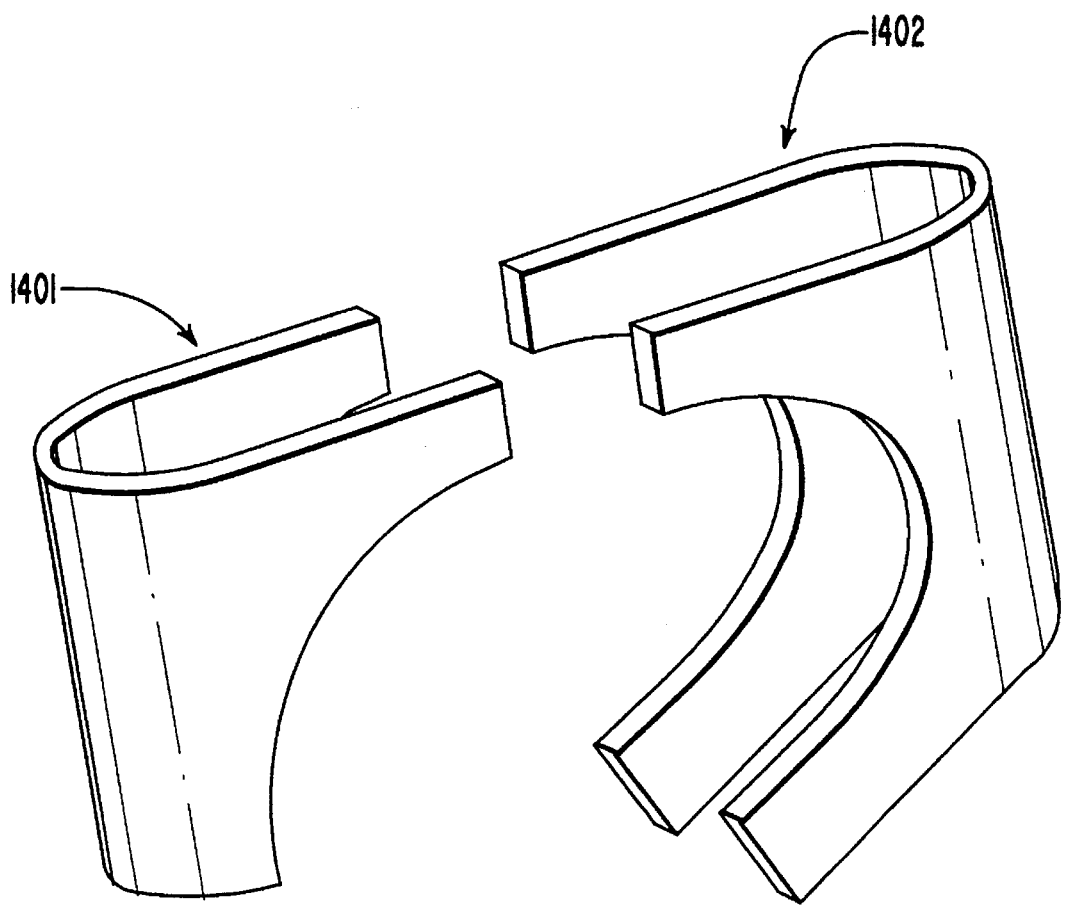
FIG. 14 depicts cap elements which have been cut from a section of cap stock.

Next, referring to FIG. 13, various cap pieces, such as head cap and seat tube cap may be cut from the cap stock 1201. It may be necessary to trace the desired cap outline on the cap stock 1201 depending on the cutting machinery employed. The result, referring to FIG. 14, are finished and usable cap pieces, such as the seat tube cap 1401 and, the head tube cap 1402 which are shown. Reinforcing side members of the preferred front and rear structural elements for a bicycle frame are similarly cut from cap stock. From FIG. 13 it can be seen that the use of the preferred mandrel 1101 results in a section of cap stock 1201 which is generally rectangular in shape, with a generally flat top section 1301, generally flat bottom section 1302, a rounded first side 1303 parallel to the longitudinal axis 1305 of the cap stock 1201, and a rounded second side 1304 parallel to the longitudinal axis 1305 of the cap stock 1201.

Referring to FIG. 15a, it can be seen that cylindrical stock 1501 such as cap stock could be manufactured and various components 1502, 1503 and 1504 could be cut from it. Such components may include seat tubes, head tubes, steer tubes and fork legs.

It should be noted that depending upon the particular application, a wide variety of materials and winding patterns may be suitable to generate a suitable finished product using the invented net shape filament winding manufacturing process. In the preferred embodiment described throughout this document, except where stated otherwise, the preferred materials used are composite materials. As used herein, "composite materials" means a matrix resin and reinforcing fibers or filament. In the preferred embodiment, carbon fiber and a heat cured epoxy are preferred although many suitable substitutes are available. For example, for fiber, one may choose from among graphite, carbon, glass (such as E or S glass), KEVLAR (trade name for "aramid fiber"), polyethylene, polyester, NYLON (trade name for "polyamide"), and others. For matrix resin, one may choose from among epoxy, rubber modified epoxy, urethane, thermoplastic, and mixtures of any of these including mixtures that utilize fibers, and others.

Additionally, although in the invented process the wound component stock material is described as preferably being manufactured using a filament winding process, it is possible to manufacture such stock material from other processes including pultrusion, roll wrapping, lay-up, braiding and injection molding.

In the preferred embodiment, in order to achieve desired wall thickness and cross sectional area of a particular component, a number of layers of fiber reinforced composite is wound in place at a desired orientation on a mandrel. Then a section of low density structural foam sheet is placed onto the layer of wound composite, and more composite is wound on top of the structural foam, sandwiching the foam between top and bottom layers of the fiber reinforced filament wound composite. FIG. 4a depicts such a structure and is discussed above. The use of the structural foam facilitates building components with desired wall thicknesses without resulting in an unduly expensive part to manufacture or an unduly heavy part. Further, the foam is easily routed or channeled to make a receptacle for installation of side reinforcing members and for making tracks to receive brake and gear shift cables. It is preferred that the foam layer in the preferred embodiment be covered with a filament wound reinforcing piece for both aesthetic reasons and for added strength and durability of the finished part.

This foam is installed during filament winding by placing a sheet of foam of the desired dimensions (length, width and thickness) on top of the initial layer or layers of composite. Subsequent composite is then wound onto the foam, resulting in a wound part that has a layer of structural foam sandwiched between two layers of filament wound material. Examples of suitable foam for this manufacturing technique include ROHACELL (trade name for foam that is generically referred to as "polyimide"), polyurethane, polyvinyl chloride, isocyanurate, polyethylene, syntactic and others. The primary function of the foam is to provide significant spacing between the bottom and top surfaces of the composite article to achieve the desired cross sectional dimensions while minimizing total weight. The foam also provides the wound part with a solid core (having trapped gas bubbles) which improves impact resistance, durability and vibration dampening. A foam which has a high strength to weight ratio is preferred to other low density core materials.

While the present invention has been described and illustrated in conjunction with a number of specific embodiments, those skilled in the art will appreciate that variations and modifications may be made without departing from the principles of the invention as herein illustrated, described and claimed. The present invention may be embodied in other specific forms without departing from its spirit or essential characteristics. The described embodiments are to be considered in all respects as only illustrative, and not restrictive. The scope of the invention is, thereof, indicated by the appended claims, rather than by the foregoing description. All changes which come within the meaning and range of equivalency of the claims are to be embraced within their scope.

We claim:

1. A fork for a vehicle, comprising:
   (a) a steer tube, said steer tube having:
      (1) an elongate tubular main steer tube section having a first end, a second end, an exterior surface, and an interior passageway, said main steer tube section comprising:
         (i) a main body portion having a first end, a second end, an exterior surface, and an interior passageway, and
         (ii) an inner reinforcing sleeve having a first end, a second end and an exterior surface,
         said main steer tube section having a longitudinal axis along which said main body portion and said inner reinforcing sleeve are oriented, each of said main body portion and said inner reinforcing sleeve having fiber helically wound along said longitudinal axis, said fiber being permanently fixed with respect to said longitudinal axis by a resin, the combination of fiber and resin forming a high strength and fatigue-resistant main steer tube section which possesses vibration and shock absorbing properties, said inner reinforcing sleeve being bonded in a fixed position in the interior passageway of said main body portion so that said inner reinforcing sleeve exterior surface is in contact with said main body portion interior passageway, and
      (2) an upper insert having an upper threaded portion and a lower portion, said lower portion inserted into said main steer tube section interior passageway so that said upper threaded portion protrudes from said main steer tube section, said upper insert being constructed from a high-strength and lightweight metal,
   (b) a crown, said crown having:
      (1) an upper receptacle receiving said steer tube therein, and
      (2) a lower receptacle receiving a leg member therein, and
   (c) said leg member having a first end and a second end, said leg member first end being inserted into said lower receptacle, and said leg member second end receiving a wheel drop out thereon, said leg member having a longitudinal axis and having fiber helically wound along said longitudinal axis, said fiber being permanently fixed with respect to said longitudinal axis by a resin, the combination of fiber and resin forming a high strength and fatigue-resistant leg member which possesses vibration and shock absorbing properties.

2. A fork for a vehicle, comprising:
(a) a steer tube, said steer tube having:
   (1) an elongate tubular main steer tube section having a first end, a second end, an exterior surface, and an interior passageway, said main steer tube section comprising:
      (i) a main body portion having a first end, a second end, an exterior surface, and an interior passageway, and
      (ii) an inner reinforcing sleeve having a first end, a second end and an exterior surface,
      said main steer tube section having a longitudinal axis along which said main body portion and said inner reinforcing sleeve are oriented, each of said main body portion and said inner reinforcing sleeve having fiber helically wound along said longitudinal axis, said fiber being permanently fixed with respect to said longitudinal axis by a resin, the combination of fiber and resin forming a high strength and fatigue-resistant main steer tube section which possesses vibration and shock absorbing properties, said inner reinforcing sleeve being bonded in a fixed position in the interior passageway of said main body portion so that said inner reinforcing sleeve exterior surface is in contact with said main body portion interior passageway, and
   (2) an upper insert having an upper threaded portion and a lower portion, said lower portion inserted into said main steer tube section interior passageway so that said upper threaded portion protrudes from said main steer tube section, said upper insert being constructed from a high-strength and lightweight metal,
(b) a crown, said crown having:
   (1) a body portion having a top and a bottom,
   (2) an upper receptacle located in the top of said body portion, said upper receptacle having an open top, a bottom and a cavity formed between said top and bottom, the upper receptacle cavity receiving said steer tube therein so that said steer tube rests adjacent to the bottom of said upper receptacle, said bottom of said upper receptacle serving to prevent travel of said steer tube through said upper receptacle to the crown bottom, and said upper receptacle having a longitudinal axis travelling generally from said crown top through said body portion bottom,
   (3) a lower receptacle located in the bottom of said body portion, said lower receptacle having an open bottom, a closed top and a cavity formed between said top and bottom, the lower receptacle cavity receiving a leg member therein so that said leg member rests adjacent to the closed top of said lower receptacle, said closed top serving to prevent travel of said leg member through said lower receptacle to the body portion top, said lower receptacle having a longitudinal axis travelling generally from said body portion top through said body portion bottom, said lower receptacle being oriented so that it is not parallel to said upper receptacle longitudinal axis and
(c) said leg member having a first end and a second end, said leg member first end inserted into said lower receptacle, and said leg member second end being receiving a wheel drop out thereon, said leg member having a longitudinal axis and having fiber helically wound along said longitudinal axis, said fiber being permanently fixed with respect to said longitudinal axis by a resin, the combination of fiber and resin forming a high strength and fatigue-resistant leg member which possesses vibration and shock absorbing properties.

3. A fork for a vehicle, comprising:
(a) a steer tube, said steer tube having:
   an elongate tubular main steer tube section having an interior passageway,
   said main steer tube section comprising:
      (i) a main body portion having a first end, a second end, an exterior surface, and an interior passageway, and
      (ii) an inner reinforcing sleeve having a first end, a second end and an exterior surface,
      said main steer tube section having a longitudinal axis along which said main body portion and said inner reinforcing sleeve are oriented, each of said main body portion and said inner reinforcing sleeve having fiber helically wound along said longitudinal axis, said fiber being permanently fixed with respect to said longitudinal axis by a resin, the combination of fiber and resin forming a high strength and fatigue-resistant main steer tube section which possesses vibration and shock absorbing properties, said inner reinforcing sleeve being bonded in a fixed position in the interior passageway of said main body portion so that said inner reinforcing sleeve exterior surface is in contact with said main body portion interior passageway;
(b) a crown, said crown having:
   (1) a body portion having a top and a bottom,
   (2) an upper receptacle located in the top of said body portion, said upper receptacle having an open top, a bottom and a cavity formed between said top and bottom, the upper receptacle cavity receiving said steer tube therein so that said steer tube rests adjacent to the bottom of said upper receptacle, said bottom serving to prevent travel of said steer tube through said upper receptacle to the body portion bottom, and said upper receptacle having a longitudinal axis travelling generally from said body portion top through said body portion bottom,
   (3) a lower receptacle located in the bottom of said body portion, said lower receptacle having an open bottom, a closed top and a cavity formed between said top and bottom, the lower receptacle cavity receiving a leg member therein so that said leg member rests adjacent to the closed top of said lower receptacle, said closed top serving to prevent travel of a leg member through said lower receptacle to the body portion top, said lower receptacle having a longitudinal axis travelling generally from said body portion top through said body portion bottom, said lower receptacle being oriented so that it is not parallel to said upper receptacle longitudinal axis; and
(c) said leg member having a first end and a second end, said leg member first end inserted into said lower receptacle, and said leg member second end receiving a wheel drop out thereon, said leg member having a longitudinal axis and having fiber helically wound along said longitudinal axis, said fiber being permanently fixed with respect to said longitudinal axis by a resin, the combination of fiber and resin forming a high strength and fatigue-resistant leg member which possesses vibration and shock absorbing properties.

4. A fork for a vehicle, comprising:

(a) a steer tube having a longitudinal axis and an interior passageway, said steer tube having fiber helically wound along said longitudinal axis, said fiber being permanently fixed with respect to said longitudinal axis by a resin, the combination of said fiber and said resin forming a high strength and fatigue-resistant steer tube which possesses vibration and shock absorbing properties, said steer tube further comprising:
  (1) an inner reinforcing sleeve having an exterior surface, said reinforcing sleeve being bonded in a fixed position in the interior passageway of said steer tube so that said inner reinforcing sleeve exterior surface is in contact with said steer tube interior passageway, and
  (2) an upper insert having an upper threaded portion and a lower portion, said lower portion inserted into said steer tube interior passageway so that said upper threaded portion protrudes from said steer tube, said upper insert being constructed from a high-strength and lightweight metal;

(b) a crown, said crown having:
  (1) an upper receptacle receiving said steer tube therein, and
  (2) a lower receptacle receiving a leg member therein; and (c) a leg member having a first end and a second end, said leg member first end being installable into said lower receptacle, and said leg member second end receiving a wheel drop out thereon, said leg member having a longitudinal axis and having fiber helically wound along said longitudinal axis, said fiber being permanently fixed with respect to said longitudinal axis by a resin, the combination of fiber and resin forming a high strength and fatigue-resistant leg member which possesses vibration and shock absorbing properties.

* * * * *